United States Patent
Luo et al.

(10) Patent No.: US 12,323,977 B2
(45) Date of Patent: Jun. 3, 2025

(54) DATA TRANSMISSION METHOD AND APPARATUS

(71) Applicant: HUAWEI TECHNOLOGIES CO., LTD., Shenzhen (CN)

(72) Inventors: Zhihu Luo, Beijing (CN); Zhe Jin, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 301 days.

(21) Appl. No.: 17/827,007

(22) Filed: May 27, 2022

(65) Prior Publication Data

US 2022/0287065 A1 Sep. 8, 2022

Related U.S. Application Data

(63) Continuation of application No. PCT/CN2019/122190, filed on Nov. 29, 2019.

(51) Int. Cl.
*H04W 72/12* (2023.01)
*H04L 1/00* (2006.01)
(Continued)

(52) U.S. Cl.
CPC ....... *H04W 72/1273* (2013.01); *H04L 1/0004* (2013.01); *H04L 27/0008* (2013.01); *H04L 27/0012* (2013.01); *H04W 72/23* (2023.01)

(58) Field of Classification Search
CPC .............. H04W 72/1273; H04W 72/23; H04L 1/0004; H04L 27/0008; H04L 27/0012
See application file for complete search history.

(56) References Cited

U.S. PATENT DOCUMENTS

2016/0100422 A1 4/2016 Papasakellariou et al.
2016/0218788 A1 7/2016 Yum et al.
(Continued)

FOREIGN PATENT DOCUMENTS

CN 103973403 A 8/2014
CN 106464647 A 2/2017
(Continued)

OTHER PUBLICATIONS

3GPP TS 36.212 V15.7.0 (Sep. 2019), 3rd Generation Partnership Project; Technical Specification Group Radio Access Network; Evolved Universal Terrestrial Radio Access (E-UTRA); Multiplexing and channel coding(Release 15), 246 pages.
(Continued)

*Primary Examiner* — Shukri Taha

(57) ABSTRACT

A data transmission method and an apparatus are provided. The method includes: A terminal device receives DCI from a network device, where the DCI is used to schedule downlink data and indicate a modulation scheme of the downlink data, the modulation scheme of the downlink data is a first modulation scheme or QPSK, and a modulation order corresponding to the first modulation scheme is greater than 2; and the terminal device receives the downlink data based on the modulation scheme. Based on the foregoing procedure, the network device indicates the modulation scheme of the downlink data by using the DCI, so that the terminal device receives the downlink data based on the modulation scheme indicated by the DCI. In this way, scheduling based on higher order modulation indicated by using the DCI is implemented.

9 Claims, 4 Drawing Sheets

(51) Int. Cl.
*H04L 27/00* (2006.01)
*H04W 72/1273* (2023.01)
*H04W 72/23* (2023.01)

(56) References Cited

U.S. PATENT DOCUMENTS

| | | |
|---|---|---|
| 2017/0180099 A1 | 6/2017 | Kim et al. |
| 2018/0019794 A1 | 1/2018 | Kowalski et al. |
| 2018/0332597 A1* | 11/2018 | Li .................. H04L 1/0016 |
| 2018/0351625 A1 | 12/2018 | Xu et al. |
| 2019/0253121 A1* | 8/2019 | Islam ............... H04B 7/0626 |
| 2020/0213033 A1* | 7/2020 | Chen ................ H04L 1/0007 |
| 2021/0013991 A1* | 1/2021 | Park .................. H04W 72/23 |
| 2021/0218493 A1* | 7/2021 | Chen ................ H04L 1/0026 |
| 2021/0226725 A1* | 7/2021 | Chen ................ H04L 1/0025 |

FOREIGN PATENT DOCUMENTS

| | | |
|---|---|---|
| WO | 2018085666 A1 | 5/2018 |
| WO | 2018204852 A1 | 11/2018 |

OTHER PUBLICATIONS

3GPP, 3rd Generation Partnership Project; Technical Specification Group Radio Access Network; NR; Physical layer procedures for data (Release 15) [online], 3GPP TS 38.214 V15.7.0, , Sep. 28, 2019, total 19 pages.

Nokia et al., "Remaining issue on supporting DL 64QAM for efeMTC", R1-1717224 3GPP TSG-RAN WG1 Meeting #90bis, Sep. 29, 2017, total 3 pages.

Intel Corp., "Remaining details of support of larger max PDSCH/PUSCH TBS", R1-1702151 3GPP TSG RAN WG1 Meeting #88, Feb. 7, 2017, total 12 pages.

KT Corp., "Views on TBS determination for Rel-13 MTC", R1-156028 3GPP TSG RAN WG1 Meeting #82bis, Sep. 25, 2015, total 3 pages.

International Search Report issued in corresponding International Application No. PCT/CN2019/122190, dated Aug. 31, 2020, pp. 1-8.

Futurewei:"Introduction of Rel-16 NB-IoT features in 36.212." 3GPP TSG-RAN WG1 Meeting #98b R1-1913165 Chongqing, China, Oct. 14-20, 2019. total 4 pages.

3rd Generation Partnership Project; Technical Specification Group Radio Access Network; Evolved Universal Terrestrial Radio Access (E-UTRA); Physical layer procedures(Release 15) 3GPP TS 36.213 V15.7.0 (Sep. 2019) total:551pages.

3rd Generation Partnership Project; Technical Specification Group Radio Access Network; Evolved Universal Terrestrial Radio Access (E-UTRA); Radio Resource Control (RRC);Protocol specification(Release 15),3GPP TS 36.331 V15.7.0 (Sep. 2019), total: 962pages.

* cited by examiner

DATA TRANSMISSION METHOD AND APPARATUS

CROSS-REFERENCE TO RELATED APPLICATIONS

This application is a continuation of International Application No. PCT/CN2019/122190, filed on Nov. 29, 2019, the disclosure of which is hereby incorporated in entirety by reference.

BACKGROUND

An internet of things (internet of things, IoT) is "an internet through which things are connected to each other". The internet of things extends user ends of the internet to any objects, to perform information exchange and communication. Such a communication mode is further referred to as machine type communication (machine type communications, MTC), and a communication node is referred to as an MTC terminal. Typical internet of things applications include a smart grid, smart agriculture, smart transportation, a smart household, environment detection, and the like. The internet of things needs to be applied to a plurality of scenarios, for example, from an outdoor scenario to an indoor scenario, and from an overground scenario to an underground scenario. Therefore, many special conditions are imposed on designs of the internet of things. In the IoT, bandwidth used for data transmission between nodes is small. Therefore, the internet of things further is referred to as a narrowband internet of things (narrowband internet of things, NB-IoT).

Currently, a modulation scheme supported by the NB-IoT in downlink is quadrature phase shift keying (quadrature phase shift keying, QPSK), and modulation schemes supported by the NB-IoT in uplink are binary phase shift keying (binary phase shift keying, BPSK) and the QPSK. The NB-IoT supports low-speed internet of things services. Higher order modulation such as 16 quadrature amplitude modulation (16 quadrature amplitude modulation, 16QAM) and 64 QAM is considered to be introduced into NB-IoT R17, to increase a data transmission rate and support internet of things services with a higher speed. How downlink control information supports scheduling based on the higher order modulation is an urgent problem to be resolved.

SUMMARY

An objective of implementations of this application is to provide a data transmission method and an apparatus, to support scheduling based on higher order modulation.

According to a first aspect, an embodiment of this application provides a data transmission method, including: A terminal device receives downlink control information DCI from a network device, where the DCI is used to schedule downlink data and indicate a modulation scheme of the downlink data, the modulation scheme of the downlink data is a first modulation scheme or quadrature phase shift keying QPSK, and a modulation order corresponding to the first modulation scheme is greater than 2; and the terminal device receives the downlink data based on the modulation scheme.

Based on the foregoing procedure, the network device indicates the modulation scheme of the downlink data by using the DCI, so that the terminal device receives the downlink data based on the modulation scheme indicated by the DCI. In this way, scheduling based on higher order modulation is implemented by using the DCI.

In a possible implementation, the DCI includes repetition quantity indication information, where the repetition quantity indication information is used to determine a repetition quantity $N_{Rep}$ of the downlink data. When $N_{Rep}$ is less than or equal to R0, the modulation scheme of the downlink data is the first modulation scheme; or when $N_{Rep}$ is greater than R0, the modulation scheme of the downlink data is the QPSK, where R0 is a positive integer greater than or equal to 1.

In a possible implementation, the repetition quantity indication information includes four bits.

In a possible implementation, the DCI includes DCI repetition quantity indication information, where the DCI repetition quantity indication information is used to determine a repetition quantity of the DCI. When the repetition quantity of the DCI is less than or equal to R1, the modulation scheme of the downlink data is the first modulation scheme; or when the repetition quantity of the DCI is greater than R1, the modulation scheme of the downlink data is the QPSK, where R1 is a positive integer greater than or equal to 1.

In a possible implementation, the DCI repetition quantity indication information includes two bits.

In a possible implementation, the DCI includes modulation and coding scheme MCS indication information, and the MCS indication information is used to determine an MCS index of the downlink data. When the MCS index is greater than or equal to M0, the modulation scheme of the downlink data is the first modulation scheme; or when the MCS index is less than M0, the modulation scheme of the downlink data is the QPSK, where M0 is an integer greater than or equal to 0.

In a possible implementation, the MCS indication information includes four bits, five bits, or six bits.

In a possible implementation, the DCI includes first information, where the first information is used to determine that the modulation scheme of the downlink data is the first modulation scheme or the QPSK. When a value of the first information is a first value, the modulation scheme of the downlink data is the first modulation scheme; or when a value of the first information is a second value, the modulation scheme of the downlink data is the QPSK.

In a possible implementation, when a CRC of a downlink control channel carrying the DCI is scrambled by using a first RNTI, the modulation scheme of the downlink data is the first modulation scheme, and the first RNTI is configured by the network device; or when a CRC of a downlink control channel carrying the DCI is scrambled by using a C-RNTI, the modulation scheme of the downlink data is the QPSK.

In a possible implementation, when the modulation scheme of the downlink data is the first modulation scheme, a quantity of bits that are in the DCI and that are used to determine the repetition quantity of the downlink data is 0, 1, 2, or 3.

In a possible implementation, when the modulation scheme of the downlink data is the first modulation scheme, a quantity of bits that are in the DCI and that are used to determine the repetition quantity of the DCI is 0 or 1.

In a possible implementation, when the modulation scheme of the downlink data is the first modulation scheme, the DCI further includes a modulation and coding scheme MCS field, where a quantity of bits included in the MCS field is 1, 2, 3, or 4.

In a possible implementation, when the modulation scheme of the downlink data is the first modulation scheme, the DCI includes second information, and the second information is used to determine a power ratio of the downlink data scheduled by the DCI to a first signal.

In a possible implementation, the second information includes M bits, where M is an integer greater than 0.

In a possible implementation, M is less than or equal to 3.

In a possible implementation, the first modulation scheme is 8PSK, 16QAM, 64QAM, or 256QAM.

In a possible implementation, a format of the DCI is format N1.

In a possible implementation, the DCI includes second information, and the second information is used to determine a power ratio of the downlink data to a first signal.

According to a second aspect, a data transmission method is provided. The method includes: A network device determines a modulation scheme of downlink data and sends downlink control information DCI to a terminal device, where the DCI is used to schedule the downlink data and indicate the modulation scheme of the downlink data, the modulation scheme of the downlink data is a first modulation scheme or quadrature phase shift keying QPSK, and a modulation order corresponding to the first modulation scheme is greater than 2; and the network device sends the downlink data to the terminal device based on the modulation scheme.

Based on the foregoing procedure, the network device indicates the modulation scheme of the downlink data by using the DCI, so that the terminal device receives the downlink data based on the modulation scheme indicated by the DCI. In this way, scheduling based on higher order modulation is implemented by using the DCI.

In a possible implementation, the DCI includes repetition quantity indication information, where the repetition quantity indication information is used to determine a repetition quantity $N_{Rep}$ of the downlink data. When $N_{Rep}$ is less than or equal to R0, the modulation scheme of the downlink data is the first modulation scheme; or when $N_{Rep}$ is greater than R0, the modulation scheme of the downlink data is the QPSK, where R0 is a positive integer greater than or equal to 1.

In a possible implementation, the repetition quantity indication information includes four bits.

In a possible implementation, the DCI includes DCI repetition quantity indication information, where the DCI repetition quantity indication information is used to determine a repetition quantity of the DCI. When the repetition quantity of the DCI is less than or equal to R1, the modulation scheme of the downlink data is the first modulation scheme; or when the repetition quantity of the DCI is greater than R1, the modulation scheme of the downlink data is the QPSK, where R1 is a positive integer greater than or equal to 1.

In a possible implementation, the DCI repetition quantity indication information includes two bits.

In a possible implementation, the DCI includes modulation and coding scheme MCS indication information, and the MCS indication information is used to determine an MCS index of the downlink data. When the MCS index is greater than or equal to M0, the modulation scheme of the downlink data is the first modulation scheme; or when the MCS index is less than M0, the modulation scheme of the downlink data is the QPSK, where M0 is an integer greater than or equal to 0.

In a possible implementation, the MCS indication information includes four bits, five bits, or six bits.

In a possible implementation, the DCI includes first information, where the first information is used to determine that the modulation scheme of the downlink data is the first modulation scheme or the QPSK. When a value of the first information is a first value, the modulation scheme of the downlink data is the first modulation scheme; or when a value of the first information is a second value, the modulation scheme of the downlink data is the QPSK.

In a possible implementation, when a CRC of a downlink control channel carrying the DCI is scrambled by using a first RNTI, the modulation scheme of the downlink data is the first modulation scheme, and the first RNTI is configured by the network device; or when a CRC of a downlink control channel carrying the DCI is scrambled by using a C-RNTI, the modulation scheme of the downlink data is the QPSK.

In a possible implementation, when the modulation scheme of the downlink data is the first modulation scheme, a quantity of bits that are in the DCI and that are used to determine the repetition quantity of the downlink data is 0, 1, 2, or 3.

In a possible implementation, when the modulation scheme of the downlink data is the first modulation scheme, a quantity of bits that are in the DCI and that are used to determine the repetition quantity of the DCI is 0 or 1.

In a possible implementation, when the modulation scheme of the downlink data is the first modulation scheme, the DCI further includes a modulation and coding scheme MCS field, where a quantity of bits included in the MCS field is 1, 2, 3, or 4.

In a possible implementation, when the modulation scheme of the downlink data is the first modulation scheme, the DCI includes second information, and the second information is used to determine a power ratio of the downlink data scheduled by the DCI to a first signal.

In a possible implementation, the second information includes M bits, where M is an integer greater than 0.

In a possible implementation, M is less than or equal to 3.

In a possible implementation, the first modulation scheme is 8PSK, 16QAM, 64QAM, or 256QAM.

In a possible implementation, a format of the DCI is format N1.

In a possible implementation, the DCI includes second information, and the second information is used to determine a power ratio of the downlink data to a first signal.

According to a third aspect, this application provides a method, including: A terminal device receives downlink control information DCI from a network device, where the DCI is used to schedule uplink data and indicate a modulation scheme of the uplink data, the modulation scheme of the uplink data is a first modulation scheme, quadrature phase shift keying QPSK, or BPSK, and a modulation order corresponding to the first modulation scheme is greater than 2; and the terminal device sends the uplink data to the network device based on the modulation scheme.

Based on the foregoing procedure, the network device indicates the modulation scheme of the uplink data by using the DCI, so that the terminal device receives the uplink data based on the modulation scheme indicated by the DCI. In this way, scheduling based on higher order modulation is implemented by using the DCI.

In a possible implementation, the DCI includes repetition quantity indication information, where the repetition quantity indication information is used to determine a repetition quantity $N_{Rep}$ of the uplink data. When $N_{Rep}$ is less than or equal to R0, the modulation scheme of the uplink data is the first modulation scheme; or when $N_{Rep}$ is greater than R0, the modulation scheme of the uplink data is the QPSK or the BPSK, where R0 is a positive integer greater than or equal to 1.

In a possible implementation, the repetition quantity indication information includes three bits.

In a possible implementation, the DCI includes DCI repetition quantity indication information, where the DCI repetition quantity indication information is used to determine a repetition quantity of the DCI. When the repetition quantity of the DCI is less than or equal to R1, the modulation scheme of the uplink data is the first modulation scheme; or when the repetition quantity of the DCI is greater than R1, the modulation scheme of the uplink data is the QPSK or the BPS K, where R1 is a positive integer greater than or equal to 1.

In a possible implementation, the DCI repetition quantity indication information includes two bits.

In a possible implementation, the DCI includes subcarrier indication information, and the subcarrier indication information is used to determine a quantity of subcarriers of the uplink data. When the quantity of subcarriers is greater than or equal to S0, the modulation scheme of the uplink data is the first modulation scheme; or when the quantity of subcarriers is less than S0, the modulation scheme of the uplink data is the QPSK or the BPSK, where S0 is a positive integer greater than or equal to 1.

In a possible implementation, the subcarrier indication information includes six bits.

In a possible implementation, the DCI includes modulation and coding scheme MCS indication information, and the MCS indication information is used to determine an MCS index of the uplink data. When the MCS index is greater than or equal to M0, the modulation scheme of the uplink data is the first modulation scheme; or when the MCS index is less than M0, the modulation scheme of the uplink data is the QPSK or the BPSK, where R1 is a positive integer greater than or equal to 1.

In a possible implementation, the MCS indication information includes four bits, five bits, or six bits.

In a possible implementation, the DCI includes first information, where the first information is used to determine the modulation scheme of the uplink data. When a value of the first information is a first value, the modulation scheme of the uplink data is the first modulation scheme; or when a value of the first information is a second value, the modulation scheme of the uplink data is the QPSK or the BPSK.

In a possible implementation, when a CRC of a downlink control channel carrying the DCI is scrambled by using a first RNTI, the modulation scheme of the uplink data is the first modulation scheme, and the first RNTI is configured by the network device; or when a CRC of a downlink control channel carrying the DCI is scrambled by using a C-RNTI, the modulation scheme of the uplink data is the QPSK or the BPSK.

In a possible implementation, when the modulation scheme of the uplink data is the first modulation scheme, a quantity of bits that are in the DCI and that are used to indicate the repetition quantity of the uplink data is 0, 1, 2, or 3.

In a possible implementation, when the modulation scheme of the uplink data is the first modulation scheme, a quantity of bits that are in the DCI and that are used to determine the repetition quantity of the DCI is 0 or 1.

In a possible implementation, when the modulation scheme of the uplink data is the first modulation scheme, a quantity of bits that are in the DCI and that are used to determine the quantity of subcarriers of the uplink data is 0, 1, 2, 3, 4, or 5.

In a possible implementation, when the modulation scheme of the uplink data is the first modulation scheme, the DCI further includes a modulation and coding scheme MCS field, where a quantity of bits included in the MCS field is 1, 2, 3, or 4.

In a possible implementation, when the modulation scheme of the uplink data is the first modulation scheme, a quantity of bits that are in the DCI and that are used to indicate a redundancy version of the uplink data is 0 or 1.

In a possible implementation, the first modulation scheme is 8PSK, 16QAM, 64QAM, or 256QAM.

In a possible implementation, a format of the DCI is format N0.

In a possible implementation, when the CRC of the downlink control channel carrying the DCI is scrambled by using an SPS C-RNTI, a value of the first information is set to 0 or 1.

According to a fourth aspect, this application provides a method, including: A network device determines a modulation scheme of uplink data and sends downlink control information DCI to a terminal device, where the DCI is used to schedule the uplink data and indicate the modulation scheme of the uplink data, the modulation scheme of the uplink data is a first modulation scheme, quadrature phase shift keying QPSK, or BPSK, and a modulation order corresponding to the first modulation scheme is greater than 2; and the network device receives the uplink data from the terminal device based on the modulation scheme.

Based on the foregoing procedure, the network device indicates the modulation scheme of the uplink data by using the DCI, so that the terminal device receives the uplink data based on the modulation scheme indicated by the DCI. In this way, scheduling based on higher order modulation is implemented by using the DCI.

In a possible implementation, the DCI includes repetition quantity indication information, where the repetition quantity indication information is used to determine a repetition quantity $N_{Rep}$ of the uplink data. When $N_{Rep}$ is less than or equal to R0, the modulation scheme of the uplink data is the first modulation scheme; or when $N_{Rep}$ is greater than R0, the modulation scheme of the uplink data is the QPSK or the BPSK, where R0 is a positive integer greater than or equal to 1.

In a possible implementation, the repetition quantity indication information includes three bits.

In a possible implementation, the DCI includes DCI repetition quantity indication information, where the DCI repetition quantity indication information is used to determine a repetition quantity of the DCI. When the repetition quantity of the DCI is less than or equal to R1, the modulation scheme of the uplink data is the first modulation scheme; or when the repetition quantity of the DCI is greater than R1, the modulation scheme of the uplink data is the QPSK or the BPS K, where R1 is a positive integer greater than or equal to 1.

In a possible implementation, the DCI repetition quantity indication information includes two bits.

In a possible implementation, the DCI includes subcarrier indication information, and the subcarrier indication information is used to determine a quantity of subcarriers of the uplink data. When the quantity of subcarriers is greater than or equal to S0, the modulation scheme of the uplink data is the first modulation scheme; or when the quantity of subcarriers is less than S0, the modulation scheme of the uplink data is the QPSK or the BPSK, where S0 is a positive integer greater than or equal to 1.

In a possible implementation, the subcarrier indication information includes six bits.

In a possible implementation, the DCI includes modulation and coding scheme MCS indication information, and the MCS indication information is used to determine an MCS index of the uplink data. When the MCS index is greater than or equal to M0, the modulation scheme of the uplink data is the first modulation scheme; or when the MCS index is less than M0, the modulation scheme of the uplink data is the QPSK or the BPSK, where R1 is a positive integer greater than or equal to 1.

In a possible implementation, the MCS indication information includes four bits, five bits, or six bits.

In a possible implementation, the DCI includes first information, where the first information is used to determine the modulation scheme of the uplink data. When a value of the first information is a first value, the modulation scheme of the uplink data is the first modulation scheme; or when a value of the first information is a second value, the modulation scheme of the uplink data is the QPSK or the BPSK.

In a possible implementation, when a CRC of a downlink control channel carrying the DCI is scrambled by using a first RNTI, the modulation scheme of the uplink data is the first modulation scheme, and the first RNTI is configured by the network device; or when a CRC of a downlink control channel carrying the DCI is scrambled by using a C-RNTI, the modulation scheme of the uplink data is the QPSK or the BPSK.

In a possible implementation, when the modulation scheme of the uplink data is the first modulation scheme, a quantity of bits that are in the DCI and that are used to indicate the repetition quantity of the uplink data is 0, 1, 2, or 3.

In a possible implementation, when the modulation scheme of the uplink data is the first modulation scheme, a quantity of bits that are in the DCI and that are used to determine the repetition quantity of the DCI is 0 or 1.

In a possible implementation, when the modulation scheme of the uplink data is the first modulation scheme, a quantity of bits that are in the DCI and that are used to determine the quantity of subcarriers of the uplink data is 0, 1, 2, 3, 4, or 5.

In a possible implementation, when the modulation scheme of the uplink data is the first modulation scheme, the DCI further includes a modulation and coding scheme MCS field, where a quantity of bits included in the MCS field is 1, 2, 3, or 4.

In a possible implementation, when the modulation scheme of the uplink data is the first modulation scheme, a quantity of bits that are in the DCI and that are used to indicate a redundancy version of the uplink data is 0 or 1.

In a possible implementation, the first modulation scheme is 8PSK, 16QAM, 64QAM, or 256QAM.

In a possible implementation, a format of the DCI is format N0.

In a possible implementation, when the CRC of the downlink control channel carrying the DCI is scrambled by using an SPS C-RNTI, a value of the first information is set to 0 or 1.

According to a fifth aspect, this application further provides a communication apparatus. The communication apparatus implements any method provided in the first aspect or the third aspect. The communication apparatus is implemented by hardware, or is implemented by hardware executing corresponding software. The hardware or the software includes one or more units corresponding to the foregoing function.

In a possible implementation, the communication apparatus includes a processor. The processor is configured to support the communication apparatus in performing a corresponding function of a terminal device in the foregoing method. The communication apparatus further includes a memory. The memory is coupled to the processor, and stores program instructions and data that are useful for the communication apparatus. Optionally, the communication apparatus further includes a communication interface. The communication interface is configured to support communication between the communication apparatus and a device such as a network device.

In a possible implementation, the communication apparatus includes corresponding function units, respectively configured to implement steps in the foregoing method. The function is implemented by hardware, or is implemented by hardware executing corresponding software. The hardware or the software includes one or more units corresponding to the foregoing function.

In a possible implementation, a structure of the communication apparatus includes a processing unit and a communication unit. The units performs corresponding functions in the foregoing method example. For details, refer to the descriptions in the method provided in the first aspect or the third aspect. Details are not described herein again.

According to a sixth aspect, this application further provides a communication apparatus. The communication apparatus implements any method provided in the second aspect or the fourth aspect. The communication apparatus is implemented by hardware, or is implemented by hardware executing corresponding software. The hardware or the software includes one or more units corresponding to the foregoing function.

In a possible implementation, the communication apparatus includes a processor. The processor is configured to support the communication apparatus in performing a corresponding function of a network device in the foregoing method. The communication apparatus further includes a memory. The memory is coupled to the processor, and stores program instructions and data that are useful for the communication apparatus. Optionally, the communication apparatus further includes a communication interface. The communication interface is configured to support communication between the communication apparatus and a device such as a terminal device.

In a possible implementation, the communication apparatus includes corresponding function units, respectively configured to implement steps in the foregoing method. The function is implemented by hardware, or is implemented by hardware executing corresponding software. The hardware or the software includes one or more units corresponding to the foregoing function.

In a possible implementation, a structure of the communication apparatus includes a processing unit and a communication unit. The units performs corresponding functions in the foregoing method example. For details, refer to the descriptions in the method provided in the second aspect or the fourth aspect. Details are not described herein again.

According to a seventh aspect, this application provides a communication apparatus. The communication apparatus includes a processor, and when the processor executes a computer program or instructions in a memory, the method according to any one of the first aspect to the fourth aspect is performed.

According to an eighth aspect, this application provides a communication apparatus. The communication apparatus includes a processor and a memory. The memory is configured to store a computer program or instructions, and the processor is configured to execute the computer program or the instructions stored in the memory, to enable the communication apparatus to perform the corresponding method according to any one of the first aspect to the fourth aspect.

According to a ninth aspect, this application provides a communication apparatus. The communication apparatus includes a processor, a memory, and a transceiver. The transceiver is configured to receive a signal or send a signal, the memory is configured to store a computer program or instructions, and the processor is configured to invoke the computer program or the instructions from the memory, to perform the method according to any one of the first aspect to the fourth aspect.

According to a tenth aspect, this application provides a communication apparatus. The communication apparatus includes a processor and an interface circuit. The interface circuit is configured to: receive code instructions and transmit the code instructions to the processor, and the processor runs the code instructions to perform the corresponding method according to any one of the first aspect to the fourth aspect.

According to an eleventh aspect, this application provides a computer-readable storage medium. The computer-readable storage medium is configured to store a computer program or instructions, and when a computer reads and executes the computer program or the instructions, the method according to any one of the first aspect to the fourth aspect is implemented.

According to a twelfth aspect, this application provides a computer program product including instructions. When a computer reads and executes the computer program product, the method according to any one of the first aspect to the fourth aspect is implemented.

According to a thirteenth aspect, this application provides a chip. The chip includes a processor. The processor is coupled to a memory, and is configured to execute a computer program or instructions stored in the memory. When the processor executes the computer program or the instructions, the method according to any one of the first aspect to the fourth aspect is implemented.

According to a fourteenth aspect, this application provides a system, including the terminal device provided in the fifth aspect and the network device provided in the sixth aspect.

DESCRIPTION OF EMBODIMENTS

The following further describes in detail embodiments of this application with reference to the accompanying drawings.

Embodiments of this application is applied to a wireless communication system, and in particular, to a mobile communication system that supports NB-IoT or eMTC, for example, a new radio (new radio, NR) system, a long term evolution (long term evolution, LTE) system, an advanced long term evolution (advanced long term evolution, LTE-A) system, an evolved long term evolution (evolved long term evolution, eLTE) system, a future communication system, or another communication system. This is not limited herein.

Figure 1:
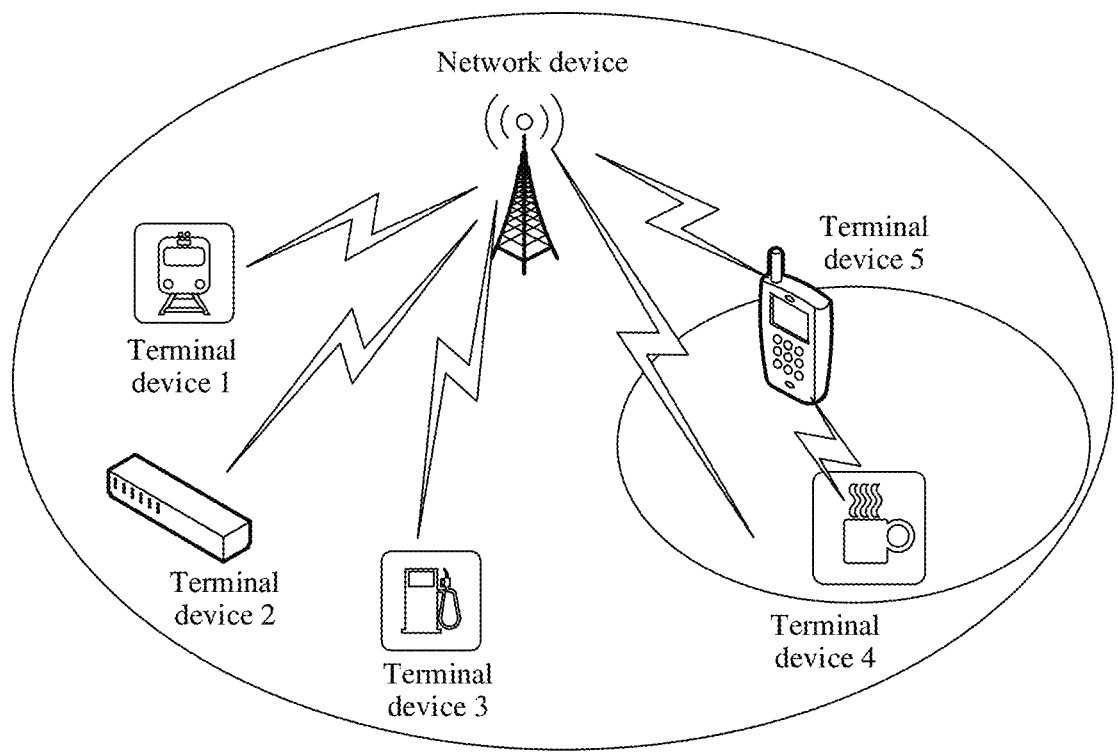
FIG. 1 is a schematic diagram of a network architecture applicable to an embodiment of this application.

For ease of understanding embodiments of this application, a communication system shown in FIG. 1 is first used as an example to describe in detail a communication system applicable to the embodiments of this application. FIG. 1 is a schematic diagram of a communication system applicable to a method according to an embodiment of this application. As shown in FIG. 1, a network device and a terminal device 1 to a terminal device 5 form a communication system. In the communication system, the network device sends information to one or more of the terminal device 1 to the terminal device 5. In addition, a terminal device 4 and the terminal device 5 further form a communication system.

The terminal device in embodiments of this application is a device having a wireless transceiver function or a chip that is disposed in any device, or further is referred to as user equipment (user equipment, UE), an access terminal, a subscriber unit, a subscriber station, a mobile station, a remote station, a remote terminal, a mobile device, a user terminal, a wireless communication device, a user agent, or a user apparatus. The terminal device in embodiments of this application is a mobile phone (mobile phone), a tablet computer (Pad), a computer having a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like.

The network device is an evolved NodeB (evolutional node B, eNB) in an LTE system, is a base transceiver station (base transceiver station, BTS) in global system for mobile communications (global system of mobile communication, GSM) or code division multiple access (code division multiple access, CDMA), is a NodeB (nodeB, NB) in a wideband code division multiple access (wideband code division multiple access, WCDMA) system, or the like.

Figure 2:
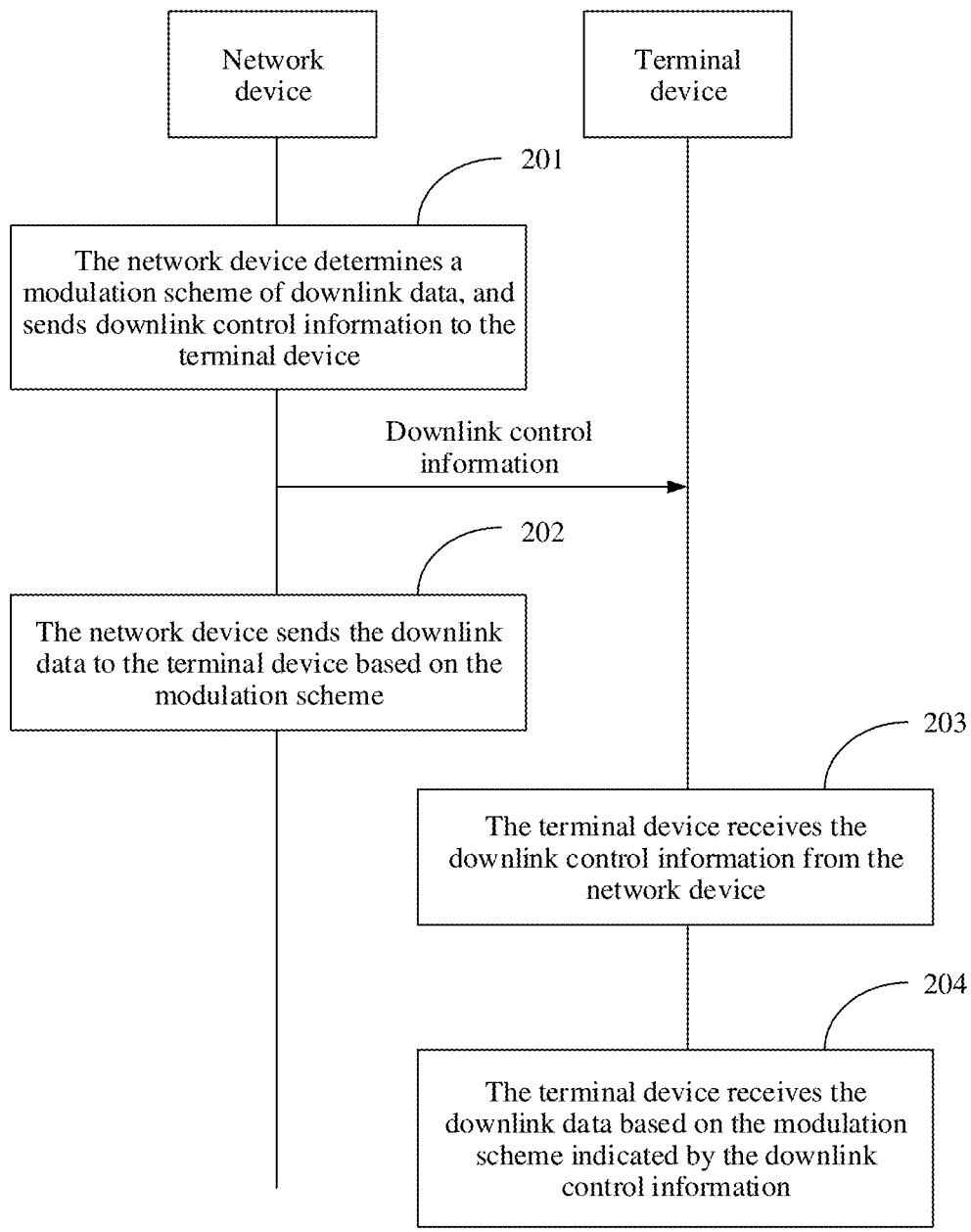
FIG. 2 is a schematic flowchart of a data transmission method according to an embodiment of this application.

With reference to the foregoing descriptions, FIG. 2 is a schematic flowchart of a data transmission method according to an embodiment of this application. Refer to FIG. 2. The method includes the following steps.

Step 201: A network device determines a modulation scheme of downlink data, and sends downlink control information to a terminal device.

In a procedure shown in FIG. 2, the downlink control information (downlink control information, DCI) is used to schedule the downlink data and indicate the modulation scheme of the downlink data, and the modulation scheme of the downlink data is a first modulation scheme or QPSK.

In this embodiment of this application, a modulation order corresponding to the first modulation scheme is greater than 2. For example, the first modulation scheme is 8PSK, 16QAM, 64QAM, or 256QAM.

How the network device determines the modulation scheme of the downlink data is not limited in this embodiment of this application.

Optionally, before step 201, the network device further sends configuration information to the terminal device, where the configuration information indicates to activate the first modulation scheme. After receiving the configuration information, the terminal device determines that the downlink data scheduled by the network device is modulated by using the first modulation scheme.

Step 202: The network device sends the downlink data to the terminal device based on the modulation scheme.

Step 203: The terminal device receives the downlink control information from the network device.

Step 204: The terminal device receives the downlink data based on the modulation scheme indicated by the downlink control information.

Based on the foregoing procedure, the network device indicates the modulation scheme of the downlink data by using the DCI, so that the terminal device receives the downlink data based on the modulation scheme indicated by the DCI.

The following separately describes how to indicate the modulation scheme of the downlink data by using the DCI.

Embodiment 1

In this embodiment, a format of the DCI is format N1, and the modulation scheme of the downlink data is implicitly indicated by using different fields in the DCI. Descriptions are separately provided below.

When the format of the DCI is format N1, for content included in the DCI, refer to Table 1.

TABLE 1

| Content included in DCI | Quantity of included bits |
| --- | --- |
| Flag for format N0/format N1 differentiation field | 1 |
| Narrowband physical downlink control channel (narrowband physical downlink control channel, NPDCCH) order (order) indicator field | 1 |
| Scheduling delay field | 3 |
| Resource allocation field | 3 |
| Modulation and coding scheme (modulation and coding scheme, MCS) field | 4 |
| Repetition quantity field | 4 |
| New data indicator field | 1 |
| Hybrid automatic repeat request (hybrid automatic repeat request, HARQ)-acknowledgment (acknowledgement, ACK) resource field | 4 |
| DCI repetition quantity field | 2 |

In Table 1, the flag for format N0/format N1 differentiation field is used to indicate the format of the DCI. Format N0 is used for uplink scheduling, and format N1 is used for downlink scheduling. The terminal device identifies whether the format of the DCI is format N0 or format N1 by using the flag for format N0/format N1 differentiation field, to determine whether the DCI is used for uplink scheduling or downlink scheduling. The flag for format N0/format N1 differentiation field further is referred to as a DCI format flag field.

The NPDCCH order indicator field is used to indicate whether current DCI-based scheduling is a random access procedure triggered by an NPDCCH order.

The scheduling delay field is used to determine a start time point of transmission of the downlink data scheduled by the DCI and/or signaling.

The resource allocation field is used to determine resource allocation for the downlink data scheduled by the DCI and/or signaling, for example, allocation of a time domain resource.

The modulation and coding scheme field is used to determine an MCS index of the downlink data scheduled by the DCI and/or the signaling. A transport block size (transport block size, TBS) of the downlink data is further determined based on the MCS field and the resource allocation field.

The repetition quantity field is used to determine a repetition quantity of the downlink data scheduled by the DCI.

The new data indicator field is used to indicate whether currently scheduled transmission is new transmission or retransmission.

The HARQ-ACK resource field is used to indicate a time-frequency resource location for transmitting acknowledgment (acknowledgement, ACK)/negative acknowledgment (negative acknowledgment, NACK) feedback information.

The DCI repetition quantity field is used to determine a repetition quantity of the DCI.

In a first possible implementation, the modulation scheme of the downlink data is determined by using repetition quantity indication information.

In this implementation, the DCI includes the repetition quantity indication information, and the repetition quantity indication information is used to determine the repetition quantity $N_{Rep}$ of the downlink data.

For example, the repetition quantity indication information is carried by using the repetition quantity field in the DCI.

A quantity of bits included in the repetition quantity indication information is not limited in this embodiment of this application. For example, the repetition quantity indication information includes four bits.

In this implementation, when $N_{Rep}$ is less than or equal to R0, the modulation scheme of the downlink data scheduled by the DCI is the first modulation scheme; or when $N_{Rep}$ is greater than R0, the modulation scheme of the downlink data scheduled by the DCI is the QPSK, where R0 is a positive integer greater than or equal to 1.

Alternatively, in this implementation, when $N_{Rep}$ is less than R0, the modulation scheme of the downlink data scheduled by the DCI is the first modulation scheme; or when $N_{Rep}$ is greater than or equal to R0, the modulation scheme of the downlink data scheduled by the DCI is the QPSK, where R0 is a positive integer greater than or equal to 1.

R0 is an agreed value or a value configured by the network device. For example, R0 is 1, 2, 4, 8, 16, 32, 64, 128, 192, 256, 384, 512, 768, 1024, 1536, or 2048.

For example, when deployment modes of carriers on which the downlink data received by the terminal device is located are different, R0 is the same or different.

For example, when the deployment mode of the carrier on which the downlink data received by the terminal device is located is an in-band deployment, a value of R0 is a first value; or when the deployment mode of the carrier on which the downlink data received by the terminal device is located is an independent deployment or a guard-band deployment, a value of R0 is a second value. The first value is less than or equal to the second value.

In a second possible implementation, the modulation scheme of the downlink data is determined by using DCI repetition quantity indication information.

In this implementation, the DCI includes the DCI repetition quantity indication information, and the DCI repetition quantity indication information is used to determine the repetition quantity of the DCI.

For example, the DCI repetition quantity indication information is carried by using the DCI repetition quantity field in the DCI.

A quantity of bits included in the DCI repetition quantity indication information is not limited in this embodiment of this application. For example, the DCI repetition quantity indication information includes two bits.

In this implementation, when the repetition quantity of the DCI is less than or equal to R1, the modulation scheme of the downlink data scheduled by the DCI is the first modulation scheme; or when the repetition quantity of the DCI is greater than R1, the modulation scheme of the downlink data scheduled by the DCI is the QPSK, where R1 is a positive integer greater than or equal to 1. Alternatively, in this implementation, when the repetition quantity of the DCI is less than R1, the modulation scheme of the downlink data scheduled by the DCI is the first modulation scheme; or when the repetition quantity of the DCI is greater than or equal to R1, the modulation scheme of the downlink data scheduled by the DCI is the QPSK, where R1 is a positive integer greater than or equal to 1.

R1 is an agreed value or a value configured by the network device. For example, R1 is 1, 2, 4, $R_{max}/8$, $R_{max}/4$, $R_{max}/2$, or $R_{max}$. $R_{max}$ is a maximum repetition quantity of a downlink control channel search space, and $R_{max}$ is configured by the network device.

For example, when deployment modes of carriers on which the downlink data received by the terminal device is located are different, R1 is the same or different.

For example, when the deployment mode of the carrier on which the downlink data received by the terminal device is located is an in-band deployment, a value of R1 is a first value; or when the deployment mode of the carrier on which the downlink data received by the terminal device is located is an independent deployment or a guard-band deployment, a value of R1 is a second value. The first value is less than or equal to the second value.

In a third possible implementation, the modulation scheme of the downlink data is determined by using MCS indication information.

In this implementation, the DCI includes the MCS indication information, and the MCS indication information is used to determine the MCS index of the downlink data.

For example, the MCS indication information is carried by using the MCS field in the DCI.

A quantity of bits included in the MCS indication information is not limited in this embodiment of this application. For example, the MCS indication information includes four bits, five bits, or six bits.

In this implementation, when the MCS index is greater than or equal to M0, the modulation scheme of the downlink data scheduled by the DCI is the first modulation scheme; or when the MCS index is less than M0, the modulation scheme of the downlink data scheduled by the DCI is the QPSK, where M0 is an integer greater than or equal to 0.

Alternatively, in this implementation, when the MCS index is greater than M0, the modulation scheme of the downlink data scheduled by the DCI is the first modulation scheme; or when the MCS index is less than or equal to M0, the modulation scheme of the downlink data scheduled by the DCI is the QPSK, where M0 is an integer greater than or equal to 0.

M0 is an agreed value or a value configured by the network device. For example, M0 is 0, 1, 2, 3, 4, 5, 6, 7, 8, 9, 10, 11, 12, 13, 14, or 15.

For example, when deployment modes of carriers on which the downlink data received by the terminal device is located are different, M0 is the same or different.

For example, when the deployment mode of the carrier on which the downlink data received by the terminal device is located is an in-band deployment, a value of M0 is a first value; or when the deployment mode of the carrier on which the downlink data received by the terminal device is located is an independent deployment or a guard-band deployment, a value of M0 is a second value. The first value is less than or equal to the second value.

In a fourth possible implementation, the modulation scheme of the downlink data is indicated by using a radio network temporary identifier (radio network temporary identifier, RNTI).

Currently, a cyclic redundancy check (cyclic redundancy check, CRC) of a downlink control channel carrying the DCI is scrambled by using the RNTI. Therefore, in this implementation, a correspondence between the RNTI and the modulation scheme is established.

For example, when the CRC of the downlink control channel carrying the DCI is scrambled by using a first RNTI, the modulation scheme of the downlink data is the first modulation scheme; or when the CRC of the downlink control channel carrying the DCI is scrambled by using a cell radio network temporary identifier (cell radio network temporary identifier, C-RNTI), the modulation scheme of the downlink data is the QPSK.

The first RNTI is configured by the network device, or is determined in another manner. The first RNTI is an RNTI dedicated for the first modulation scheme. The first RNTI is different from the C-RNTI. A form of the first RNTI is not limited in this application, and details are not described herein.

Any one of the first to the fourth possible implementations is an example. Alternatively, the modulation scheme of the downlink data is jointly indicated by using a plurality of fields in the DCI. Details about how to perform indication are not described herein.

Currently, for a correspondence between the MCS index indicated by the MCS field and a TBS index, refer to Table 2.

TABLE 2

| MCS index | Modulation order | TBS index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 2 | 11 |
| 12 | 2 | 12 |
| 13 | 2 | 13 |

With reference to the foregoing descriptions, in the first to the fourth possible implementations, when the modulation scheme of the downlink data scheduled by the DCI is the QPSK, the correspondence between the MCS index indicated by the MCS field and the TBS index remains unchanged, as shown in Table 2.

When the modulation scheme of the downlink data scheduled by the DCI is the first modulation scheme, the correspondence between the MCS index indicated by the MCS field and the TBS index is shown in Table 3.

TABLE 3

| MCS index | Modulation order | TBS index |
|---|---|---|
| 0 | 4 | 12 |
| 1 | 4 | 13 |
| 2 | 4 | 14 |
| 3 | 4 | 15 |
| 4 | 4 | 16 |
| 5 | 4 | 17 |
| 6 | 4 | 18 |
| 7 | 4 | 19 |

Certainly, the foregoing is an example. When the quantity of bits included in the MCS field is another value, refer to the foregoing descriptions. Details are not described herein again.

Further, in any one of the first to the fourth possible implementations, the DCI further includes second information, and the second information is used to determine a power ratio of the downlink data scheduled by the DCI to a first signal.

The first signal is a narrowband reference signal (narrowband reference signal, NRS), a cell-specific reference signal (cell-specific reference signal, CRS), a demodulation reference signal (demodulation reference signal, DMRS), a narrowband secondary synchronization signal (narrowband secondary synchronization signal, NSSS), a narrowband primary synchronization signal (narrowband primary synchronization signal, NPSS), a secondary synchronization signal (secondary synchronization signal, SSS), or a primary synchronization signal (primary synchronization signal, PSS).

The power ratio is a ratio of energy per resource element (energy per resource element, EPRE). In other words, the second information is used to determine a ratio of EPRE of the downlink data scheduled by the DCI to EPRE of the first signal.

The DCI includes the second information in any case. Alternatively, when the modulation scheme of the downlink data scheduled by the DCI is the first modulation scheme, the DCI includes the second information. Correspondingly, when the modulation scheme of the downlink data scheduled by the DCI is the QPSK, the DCI does not include the second information.

In the foregoing method, the power ratio is indicated by using the second information, to implement power control on the downlink data and improve transmission robustness.

In Embodiment 1, when the DCI includes the second information, the second information includes M bits, where M is an integer greater than 0. For example, M is less than or equal to 3. For example, M is 0, 1, 2, or 3.

For example, when the second information includes two bits, the power ratio of the downlink data indicated by the second information to the first signal is shown in Table 4.

TABLE 4

| Second information | Power ratio of downlink data to a first signal |
|---|---|
| 00 | First ratio |
| 01 | Second ratio |
| 11 | Third ratio |
| 10 | Fourth ratio |

In Table 4, values of the first ratio to the fourth ratio is determined based on an actual situation. This is not limited herein.

When the DCI includes the second information, there is a plurality of implementations. Descriptions are separately provided below.

Implementation 1: A quantity of bits included in another indicator field in the DCI remains unchanged, and the existing DCI format N1 is extended. That is, M bits are added to the existing DCI format N1, and the M bits are used to carry the second information.

Implementation 2: A quantity of bits in one or more indicator fields in the DCI is reduced, and some or all of redundant bits are used as bits included in the second information. In this manner, compared with a quantity of bits included in the DCI in format N1 in the conventional technology, a quantity of bits included in the DCI remains unchanged, or at least one bit is added to the DCI.

A quantity of bits in one or more of the following indicator fields in the DCI is reduced, for example,
the MCS field, the repetition quantity field, and the DCI repetition quantity field.

With reference to the foregoing descriptions, if L1 bits are removed from the MCS field, L2 bits are removed from the repetition quantity field, L3 bits are removed from the DCI repetition quantity field, and a quantity of bits included in the second information is M, M≥L1+L2+L3. L1, L2, and L3 are integers greater than or equal to 0.

When the quantity of bits included in the MCS field is reduced, one to three bits are removed from the MCS field. That is, the quantity of bits included in the MCS field is 1, 2, or 3. Correspondingly, when the MCS indication information is carried by using the MCS field, a quantity of bits included in the MCS indication information is 1, 2, or 3.

When the quantity of bits included in the repetition quantity field is reduced, one to four bits are removed from the repetition quantity field. That is, the quantity of bits included in the repetition quantity field is 0, 1, 2, or 3. When the repetition quantity indication information is carried by using the repetition quantity field, a quantity of bits included in the repetition quantity indication information is 0, 1, 2, or 3. That the quantity of bits included in the repetition quantity indication information is 0 is understood as that the DCI does not include the repetition quantity indication information, or that the DCI does not include the repetition quantity field. In this case, the repetition quantity of the downlink data scheduled by the DCI is 1 or another agreed value.

When the quantity of bits included in the DCI repetition quantity field is reduced, one or two bits are removed from the DCI repetition quantity field. That is, the quantity of bits included in the DCI repetition quantity field is 0 or 1. When the DCI repetition quantity indication information is carried by using the DCI repetition quantity field, a quantity of bits included in the DCI repetition quantity indication information is 0 or 1. That the quantity of bits included in the repetition quantity indication information is 0 is understood as that the DCI does not include the DCI repetition quantity indication information, or that the DCI does not include the DCI repetition quantity field. In this case, the repetition quantity of the DCI is 1 or another agreed value.

When the DCI does not include the second information, the quantities of bits included in the MCS field, the repetition quantity field, and the DCI repetition quantity field remains unchanged. In this case, the MCS field includes three bits, the repetition quantity field includes four bits, and the DCI repetition quantity field includes two bits.

In this embodiment of this application, alternatively, the modulation scheme of the downlink data scheduled by the DCI is indicated by whether the second information is carried in the DCI. For details, refer to descriptions in Embodiment 2.

In this embodiment of this application, the modulation scheme of the downlink data is implicitly indicated by using different fields in the DCI, so that DCI signaling overheads are reduced.

Embodiment 2

The modulation scheme of the downlink data is determined by using MCS indication information.

In this implementation, the DCI includes the MCS indication information, and the MCS indication information is used to determine an MCS index of the downlink data.

For example, the MCS indication information is carried by using an MCS field in the DCI.

A quantity of bits included in the MCS indication information is not limited in this embodiment of this application. For example, the MCS indication information includes four bits, five bits, or six bits.

In this implementation, when the MCS index is greater than or equal to M0, the modulation scheme of the downlink data scheduled by the DCI is the first modulation scheme; or when the MCS index is less than M0, the modulation scheme of the downlink data scheduled by the DCI is the QPSK, where M0 is an integer greater than or equal to 0.

Alternatively, in this implementation, when the MCS index is greater than M0, the modulation scheme of the downlink data scheduled by the DCI is the first modulation scheme; or when the MCS index is less than or equal to M0, the modulation scheme of the downlink data scheduled by the DCI is the QPSK, where M0 is an integer greater than or equal to 0.

M0 is an agreed value or a value configured by the network device. For example, M0 is 0, 1, 2, 3, 4, 5, 6, 7, 8, 9, 10, 11, 12, 13, 14, or 15.

For example, when deployment modes of carriers on which the downlink data received by the terminal device is located are different, M0 is the same or different.

For example, when the deployment mode of the carrier on which the downlink data received by the terminal device is located is an in-band deployment, a value of M0 is a first value; or when the deployment mode of the carrier on which the downlink data received by the terminal device is located is an independent deployment or a guard-band deployment, a value of M0 is a second value. The first value is less than or equal to the second value.

Further, in any one of the first to the fourth possible implementations, the DCI further includes second information, and the second information is used to determine a power ratio of the downlink data scheduled by the DCI to a first signal.

The DCI includes the second information in any case. Alternatively, when the modulation scheme of the downlink data scheduled by the DCI is the first modulation scheme, the DCI includes the second information. Correspondingly, when the modulation scheme of the downlink data scheduled by the DCI is the QPSK, the DCI does not include the second information.

In this embodiment of this application, a quantity of bits included in the MCS field is 4, 5, or 6.

For example, when the quantity of bits included in the MCS field is 4, a correspondence between the MCS index indicated by the MCS field and a TBS index is shown in Table 5a or Table 5b. When the deployment mode of the carrier on which the downlink data received by the terminal device is located is the independent deployment or the guard-band deployment, the correspondence between the MCS index indicated by the MCS field and the TBS index is shown in Table 5a. When the deployment mode of the carrier on which the downlink data received by the terminal device is located is the in-band deployment, the correspondence between the MCS index indicated by the MCS field and the TBS index is shown in Table 5b.

TABLE 5a

| MCS index | Modulation order | TBS index |
|---|---|---|
| 0 | 2 | 0 |
| 1 | 2 | 2 |
| 2 | 2 | 4 |
| 3 | 2 | 6 |
| 4 | 2 | 8 |
| 5 | 2 | 10 |
| 6 | 2 | 12 |
| 7 | 2 | 13 |
| 9 | 4 | 12 |
| 10 | 4 | 13 |
| 11 | 4 | 14 |
| 12 | 4 | 15 |
| 13 | 4 | 16 |
| 14 | 4 | 17 |
| 15 | 4 | 18 |

TABLE 5b

| MCS index | Modulation order | TBS index |
|---|---|---|
| 0 | 2 | 0 |
| 1 | 2 | 2 |
| 2 | 2 | 4 |
| 3 | 2 | 6 |
| 4 | 2 | 8 |
| 5 | 2 | 10 |
| 6 | 4 | 8 |
| 7 | 4 | 9 |
| 9 | 4 | 10 |
| 10 | 4 | 11 |
| 11 | 4 | 12 |
| 12 | 4 | 13 |
| 13 | 4 | 14 |
| 14 | 4 | 15 |
| 15 | 4 | 16 |

For example, when the quantity of bits included in the MCS field is 5, a correspondence between the MCS index indicated by the MCS field and a TBS index is shown in Table 6.

TABLE 6

| MCS index | Modulation order | TBS index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 2 | 11 |
| 12 | 2 | 12 |
| 13 | 2 | 13 |
| 17 | 4 | 12 |
| 18 | 4 | 13 |
| 19 | 4 | 14 |

TABLE 6-continued

| MCS index | Modulation order | TBS index |
|---|---|---|
| 20 | 4 | 15 |
| 21 | 4 | 16 |
| 22 | 4 | 17 |
| 23 | 4 | 18 |
| 24 | 4 | 19 |

Certainly, the foregoing is an example. When the quantity of bits included in the MCS field is another value, refer to the foregoing descriptions. Details are not described herein again.

In this embodiment of this application, the DCI further includes first information, and the first information indicates the modulation scheme of the downlink data scheduled by the DCI. For details, refer to descriptions in Embodiment 3.

For descriptions of the first signal and the power ratio in this embodiment, refer to descriptions of some related content in Embodiment 1. Details are not described herein again.

In this embodiment of this application, the modulation scheme of the downlink data is indicated by using the MCS field in the DCI, so that DCI signaling overheads are reduced. In addition, scheduling flexibility of a base station is prevented from being affected by tailoring another field. Therefore, the base station implements flexible scheduling according to this embodiment.

Embodiment 3

The DCI includes first information, and the first information is used to determine that the modulation scheme of the downlink data scheduled by the DCI is the first modulation scheme or the QPSK.

For example, when a value of the first information is a first value, the modulation scheme of the downlink data scheduled by the DCI is the first modulation scheme; or when a value of the first information is a second value, the modulation scheme of the downlink data scheduled by the DCI is the QPSK. The first value is different from the second value. Implementations of the first value and the second value are not limited in this embodiment of this application.

The first information includes at least one bit. A quantity of included bits are determined based on an actual situation. For example, the first information includes one bit. When the value of the first information is 1, the modulation scheme of the downlink data scheduled by the DCI is the first modulation scheme; or when the value of the first information is 0, the modulation scheme of the downlink data scheduled by the DCI is the QPSK. Alternatively, when the value of the first information is 0, the modulation scheme of the downlink data scheduled by the DCI is the first modulation scheme; or when the value of the first information is 1, the modulation scheme of the downlink data scheduled by the DCI is the QPSK. When the first information includes another quantity of bits, refer to the foregoing descriptions. Details are not described herein again.

For example, in Embodiment 3, when the modulation scheme of the downlink data scheduled by the DCI is the first modulation scheme, the DCI further includes second information, and the second information includes M bits.

When the DCI includes the second information, there is a plurality of implementations. Descriptions are separately provided below.

Implementation 1: A quantity of bits included in another indicator field in the DCI remains unchanged, and the existing DCI format N1 is extended. That is, M bits are added to the existing DCI format N1, and the M bits are used to carry the second information.

Implementation 2: Quantities of bits in an MCS field and a repetition quantity field in the DCI are reduced, and redundant bits are used as bits included in the second information. In this manner, 1 to 3 bits are removed from the MCS field, and 1 or 2 bits are removed from the repetition quantity field. For example, the first information, the MCS field, the repetition quantity field, and the second information that are included in the DCI is shown in Table 7.

TABLE 7

| Content included in DCI | Quantity of included bits |
|---|---|
| First information | 1 |
| MCS field | 3 |
| Repetition quantity field | 2 |
| Second information | 3 |

In Table 7, the MCS field includes three bits, and one bit is reduced compared with the conventional technology. The repetition quantity field includes two bits, and two bits are reduced compared with the conventional technology. For other content included in the DCI, refer to Table 1. Details are not described herein again.

In this implementation, when the modulation scheme of the downlink data scheduled by the DCI is the QPSK, for a correspondence between an MCS index indicated by the MCS field and a TBS index, refer to Table 2. When the modulation scheme of the downlink data scheduled by the DCI is the first modulation scheme, for a correspondence between an MCS index indicated by the MCS field and a TBS index, refer to Table 3.

In this implementation, a quantity of bits in one or more of the MCS field, the repetition quantity field, and the DCI repetition quantity field in the DCI is reduced.

For example, when the quantity of bits included in the MCS field is reduced, one to three bits are removed from the MCS field. That is, the quantity of bits included in the MCS field is 1, 2, or 3. When the quantity of bits included in the repetition quantity field is reduced, one to four bits are removed from the repetition quantity field. That is, the quantity of bits included in the repetition quantity field is 0, 1, 2, or 3. When the quantity of bits included in the DCI repetition quantity field is reduced, one or two bits are removed from the DCI repetition quantity field. That is, the quantity of bits included in the DCI repetition quantity field is 0 or 1.

When the DCI does not include the second information, the quantities of bits included in the MCS field, the repetition quantity field, and the DCI repetition quantity field remains unchanged. In this case, the MCS field includes three bits, the repetition quantity field includes four bits, and the DCI repetition quantity field includes two bits.

For details about how to reduce the quantities of bits in the MCS field, the repetition quantity field, and the DCI repetition quantity field in the DCI, refer to descriptions of some related content in the foregoing Embodiment 1. Details are not described herein again.

For descriptions of a first signal and a power ratio in this embodiment, refer to descriptions of some related content in Embodiment 1. Details are not described herein again.

In this embodiment of this application, some fields in the DCI are tailored, so that DCI signaling overheads are reduced.

The foregoing describes a case in which the downlink data is scheduled by the DCI. An embodiment of this application further provides a method. The method is applied to a case in which uplink data is scheduled by the DCI. Descriptions are separately provided below.

Figure 3:
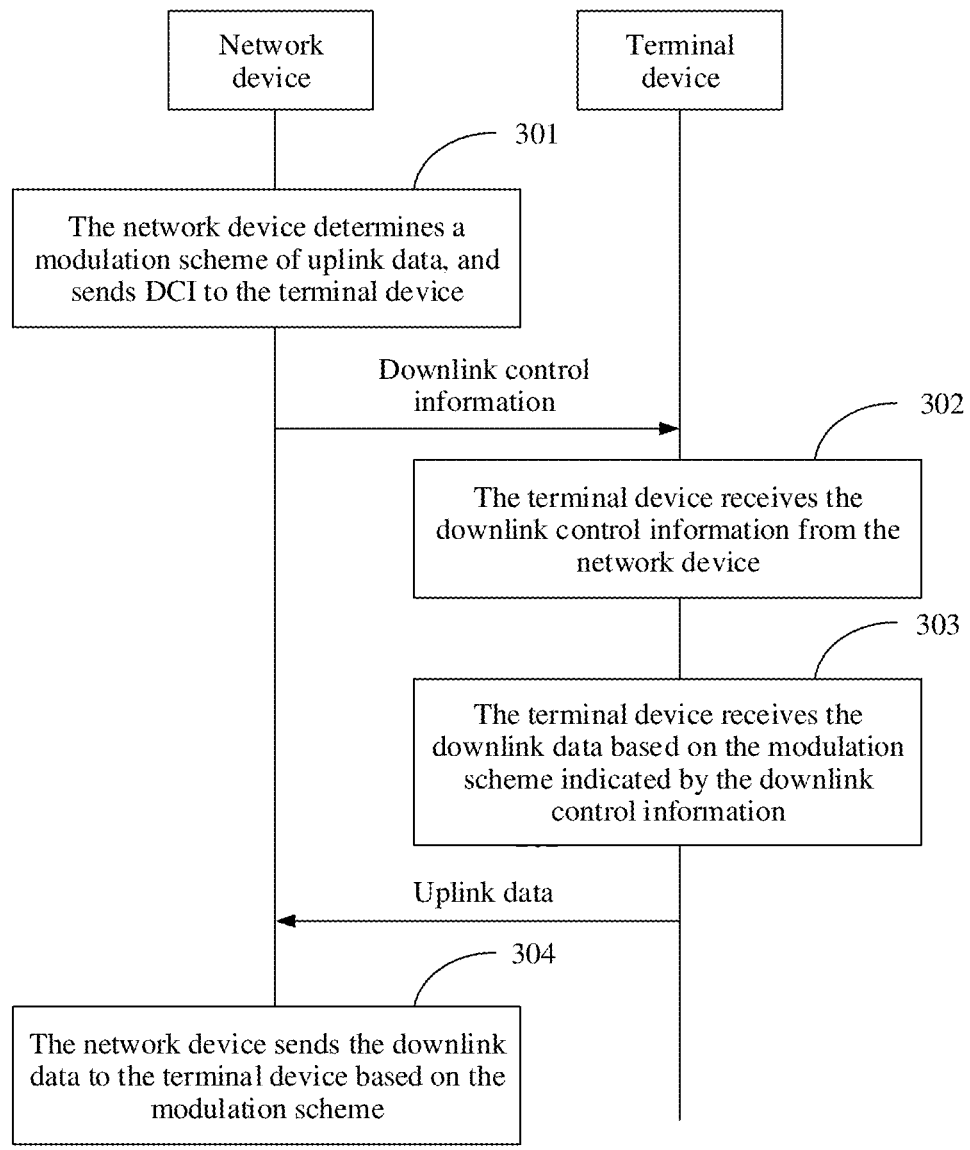
FIG. 3 is a schematic flowchart of a data transmission method according to an embodiment of this application.

FIG. 3 is a schematic flowchart of a data transmission method according to an embodiment of this application. Refer to FIG. 3. The method includes the following steps.

Step 301: A network device determines a modulation scheme of uplink data, and sends DCI to a terminal device.

The DCI is used to schedule the uplink data and indicate the modulation scheme of the uplink data, and the modulation scheme of the uplink data is a first modulation scheme, QPSK, or BPS K.

In this embodiment of this application, a modulation order corresponding to the first modulation scheme is greater than 2. For example, the first modulation scheme is 8PSK, 16QAM, 64QAM, or 256QAM.

How the network device determines the modulation scheme of the uplink data is not limited in this embodiment of this application.

Optionally, before step 301, the network device further sends configuration information to the terminal device, where the configuration information indicates to activate the first modulation scheme. After receiving the configuration information, the terminal device determines that the uplink data scheduled by the network device is modulated by using the first modulation scheme.

Step 302: The terminal device receives the DCI from the network device.

Step 303: The terminal device sends the uplink data to the network device based on the modulation scheme indicated by the DCI.

Step 304: The network device receives the uplink data from the terminal device based on the modulation scheme.

Based on the foregoing procedure, the network device indicates the modulation scheme of the uplink data by using the DCI, so that the terminal device sends the uplink data based on the modulation scheme indicated by the DCI.

The following separately describes how to indicate the modulation scheme of the uplink data by using the DCI.

Embodiment 4

In this embodiment, a format of the DCI is format N0, and the modulation scheme of the uplink data is implicitly indicated by using different fields in the DCI. Descriptions are separately provided below.

When the format of the DCI is format N0, for content included in the DCI, refer to Table 8.

TABLE 8

| Content included in DCI | Quantity of included bits |
| --- | --- |
| Flag for format N0/format N1 differentiation field | 1 |
| Subcarrier indicator field | 6 |
| Resource allocation field | 3 |
| Scheduling delay field | 2 |
| MCS field | 4 |
| Redundancy version (Redundancy Version, RV) field | 1 |
| Repetition quantity field | 3 |
| New data indicator field | 1 |
| DCI repetition quantity field | 2 |

In Table 8, the flag for format N0/format N1 differentiation field is used to indicate the format of the DCI. Format N0 is used for uplink scheduling, and format N1 is used for downlink scheduling.

The subcarrier indicator field is used to indicate a set of consecutive subcarriers.

The scheduling delay field is used to determine a start time point of transmission of the uplink data scheduled by the DCI and/or signaling.

The resource allocation field is used to determine resource allocation for the uplink data scheduled by the DCI and/or signaling, for example, allocation of a time domain resource.

The modulation and coding scheme field is used to determine an MCS index of the uplink data scheduled by the DCI and/or the signaling. A transport block size (transport block size, TBS) of the uplink data is further determined based on the MCS field and the resource allocation field.

The repetition quantity field is used to determine a repetition quantity of the uplink data scheduled by the DCI.

The new data indicator field is used to indicate whether currently scheduled transmission is new transmission or retransmission.

The redundancy version field is used to determine a redundancy version used in transmission of the uplink data and/or the signaling.

The DCI repetition quantity field is used to determine a repetition quantity of the DCI.

In a first possible implementation, the DCI includes repetition quantity indication information, and the repetition quantity indication information is used to determine the repetition quantity $N_{Rep}$ of the uplink data.

For example, the repetition quantity indication information is carried by using the repetition quantity field in the DCI.

A quantity of bits included in the repetition quantity indication information is not limited in this embodiment of this application. For example, the repetition quantity indication information includes four bits.

In this implementation, when $N_{Rep}$ is less than or equal to R0, the modulation scheme of the uplink data scheduled by the DCI is the first modulation scheme; or when $N_{Rep}$ is greater than R0, the modulation scheme of the uplink data scheduled by the DCI is the QPSK or the BPSK, where R0 is a positive integer greater than or equal to 1.

Alternatively, in this implementation, when $N_{Rep}$ is less than R0, the modulation scheme of the uplink data scheduled by the DCI is the first modulation scheme; or when $N_{Rep}$ is greater than or equal to R0, the modulation scheme of the uplink data scheduled by the DCI is the QPSK or the BPS K, where R0 is a positive integer greater than or equal to 1.

R0 is an agreed value or a value configured by the network device. For example, R0 is 1, 2, 4, 8, 16, 32, 64, or 128.

For example, R0 is determined based on a quantity of subcarriers used by the terminal device to send the uplink data. For example, when the quantity of subcarriers used by the terminal device to send the uplink data is 1, a value of R0 is a first value; or when the quantity of subcarriers used by the terminal device to send the uplink data is 3, 6, or 12, a value of R0 is a second value. The first value is less than or equal to the second value.

In a second possible implementation, the DCI includes DCI repetition quantity indication information, and the DCI repetition quantity indication information is used to determine the repetition quantity of the DCI.

For example, the DCI repetition quantity indication information is carried by using the DCI repetition quantity field in the DCI.

A quantity of bits included in the DCI repetition quantity indication information is not limited in this embodiment of this application. For example, the DCI repetition quantity indication information includes two bits.

In this implementation, when the repetition quantity of the DCI is less than or equal to R1, the modulation scheme of the uplink data scheduled by the DCI is the first modulation scheme; or when the repetition quantity of the DCI is greater than R1, the modulation scheme of the uplink data scheduled by the DCI is the QPSK or the BPSK, where R1 is a positive integer greater than or equal to 1.

Alternatively, in this implementation, when the repetition quantity of the DCI is less than R1, the modulation scheme of the uplink data scheduled by the DCI is the first modulation scheme; or when the repetition quantity of the DCI is greater than or equal to R1, the modulation scheme of the uplink data scheduled by the DCI is the QPSK or the BPSK, where R1 is a positive integer greater than or equal to 1.

R1 is an agreed value or a value configured by the network device. For example, R1 is 1, 2, 4, $R_{max}/8$, $R_{max}/4$, $R_{max}/2$, or $R_{max}$. $R_{max}$ is a maximum repetition quantity of a downlink control channel search space, and $R_{max}$ is configured by the network device.

For example, R1 is determined based on a quantity of subcarriers used by the terminal device to send the uplink data. For example, when the quantity of subcarriers used by the terminal device to send the uplink data is 1, a value of R1 is a first value; or when the quantity of subcarriers used by the terminal device to send the uplink data is 3, 6, or 12, a value of R1 is a second value. The first value is less than or equal to the second value.

In a third possible implementation, the DCI includes MCS indication information, and the MCS indication information is used to determine the MCS index of the uplink data.

For example, the MCS indication information is carried by using the MCS field in the DCI.

A quantity of bits included in the MCS indication information is not limited in this embodiment of this application. For example, the MCS indication information includes four bits, five bits, or six bits.

In this implementation, when the MCS index is greater than or equal to M0, the modulation scheme of the uplink data scheduled by the DCI is the first modulation scheme; or when the MCS index is less than M0, the modulation scheme of the uplink data scheduled by the DCI is the QPSK or the BPSK, where M0 is an integer greater than or equal to 0.

Alternatively, in this implementation, when the MCS index is greater than M0, the modulation scheme of the uplink data scheduled by the DCI is the first modulation scheme; or when the MCS index is less than or equal to M0, the modulation scheme of the uplink data scheduled by the DCI is the QPSK or the BPSK, where M0 is an integer greater than or equal to 0.

M0 is an agreed value or a value configured by the network device. For example, M0 is 0, 1, 2, 3, 4, 5, 6, 7, 8, 9, 10, 11, 12, 13, 14, or 15.

For example, M0 is determined based on a quantity of subcarriers used by the terminal device to send the uplink data. For example, when the quantity of subcarriers used by the terminal device to send the uplink data is 1, a value of M0 is a first value; or when the quantity of subcarriers used by the terminal device to send the uplink data is 3, 6, or 12, a value of M0 is a second value. The first value is less than or equal to the second value.

In the third possible implementation, the MCS indication information is carried by using the MCS field in the DCI. When the modulation scheme of the uplink data scheduled by the DCI is the QPSK or the BPSK, a correspondence between the MCS index indicated by the MCS field and a TBS index is shown in the foregoing Table 2.

When the modulation scheme of the uplink data scheduled by the DCI is the first modulation scheme, a correspondence between the MCS index indicated by the MCS field and a TBS index is shown in the foregoing Table 3.

Alternatively, a quantity of bits included in the MCS field is increased. In this case, the quantity of bits included in the MCS field is greater than 4. For example, when the quantity of bits included in the MCS field is 5, a correspondence between the MCS index indicated by the MCS field and a TBS index is shown in the foregoing Table 6.

In a fourth possible implementation, the DCI includes MCS indication information, and the MCS indication information is used to determine the MCS index of the uplink data.

For example, the MCS indication information is carried by using the MCS field in the DCI.

A quantity of bits included in the MCS indication information is not limited in this embodiment of this application. For example, the MCS indication information includes four bits, five bits, or six bits.

In this implementation, when the MCS index is greater than or equal to M0, the modulation scheme of the uplink data scheduled by the DCI is the first modulation scheme; or when the MCS index is less than M0, the modulation scheme of the uplink data scheduled by the DCI is the QPSK or the BPSK, where M0 is an integer greater than or equal to 0.

Alternatively, in this implementation, when the MCS index is greater than M0, the modulation scheme of the uplink data scheduled by the DCI is the first modulation scheme; or when the MCS index is less than or equal to M0, the modulation scheme of the uplink data scheduled by the DCI is the QPSK or the BPSK, where M0 is an integer greater than or equal to 0.

M0 is an agreed value or a value configured by the network device. For example, M0 is 0, 1, 2, 3, 4, 5, 6, 7, 8, 9, 10, 11, 12, 13, 14, or 15.

For example, M0 is determined based on a quantity of subcarriers used by the terminal device to send the uplink data. For example, when the quantity of subcarriers used by the terminal device to send the uplink data is 1, a value of M0 is a first value; or when the quantity of subcarriers used by the terminal device to send the uplink data is 3, 6, or 12, a value of M0 is a second value. The first value is less than or equal to the second value.

For example, when a quantity of bits included in the MCS field is 5, a correspondence between the MCS index indicated by the MCS field and a TBS index is shown in Table 9a or Table 9b. When the quantity of subcarriers used by the terminal device to send the uplink data is greater than 1, the correspondence between the MCS index indicated by the MCS field and the TBS index is shown in Table 9a. When the quantity of subcarriers used by the terminal device to send the uplink data is 1, the correspondence between the MCS index indicated by the MCS field and the TBS index is shown in Table 9b.

TABLE 9a

| MCS index | Modulation order | TBS index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 2 | 11 |
| 12 | 2 | 12 |
| 13 | 2 | 13 |
| 17 | 4 | 12 |
| 18 | 4 | 13 |
| 19 | 4 | 14 |
| 20 | 4 | 15 |
| 21 | 4 | 16 |
| 22 | 4 | 17 |
| 23 | 4 | 18 |
| 24 | 4 | 19 |

TABLE 9b

| MCS index | Modulation order | TBS index |
|---|---|---|
| 0 | 1 | 0 |
| 1 | 1 | 2 |
| 2 | 2 | 1 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 2 | 11 |
| 12 | 2 | 12 |
| 13 | 2 | 13 |
| 17 | 4 | 12 |
| 18 | 4 | 13 |
| 19 | 4 | 14 |
| 20 | 4 | 15 |
| 21 | 4 | 16 |
| 22 | 4 | 17 |
| 23 | 4 | 18 |
| 24 | 4 | 19 |

In a fifth possible implementation, the modulation scheme of the uplink data is indicated by using an RNTI.

In this implementation, a correspondence between the RNTI and the modulation scheme is established.

For example, when a CRC of a downlink control channel carrying the DCI is scrambled by using a first RNTI, the modulation scheme of the uplink data is the first modulation scheme; or when a CRC of a downlink control channel carrying the DCI is scrambled by using a C-RNTI, the modulation scheme of the uplink data is the QPSK or the BPSK.

The first RNTI is configured by the network device, or is determined in another manner. The first RNTI is an RNTI dedicated for the first modulation scheme. The first RNTI is different from the C-RNTI. A form of the first RNTI is not limited in this application, and details are not described herein.

In a sixth possible implementation, the modulation scheme of the uplink data is indicated by using a subcarrier.

In this implementation, the DCI includes subcarrier indication information, and the subcarrier indication information is used to determine a quantity of subcarriers of the uplink data.

For example, the subcarrier indication information is carried by using the subcarrier indicator field in the DCI.

In this implementation, when the quantity of subcarriers determined by the subcarrier indication information is greater than or equal to S0, the modulation scheme of the uplink data scheduled by the DCI is the first modulation scheme; or when the quantity of subcarriers determined by the subcarrier indication information is less than S0, the modulation scheme of the uplink data scheduled by the DCI is the QPSK or the BPSK, where S0 is a positive integer greater than or equal to 1.

Alternatively, when the quantity of subcarriers determined by the subcarrier indication information is greater than S0, the modulation scheme of the uplink data scheduled by the DCI is the first modulation scheme; or when the quantity of subcarriers determined by the subcarrier indication information is less than or equal to S0, the modulation scheme of the uplink data scheduled by the DCI is the QPSK or the BPSK, where S0 is a positive integer greater than or equal to 1.

Alternatively, when the quantity of subcarriers determined by the subcarrier indication information belongs to a first set, the modulation scheme of the uplink data scheduled by the DCI is the first modulation scheme; or when the quantity of subcarriers determined by the subcarrier indication information belongs to a second set, the modulation scheme of the uplink data scheduled by the DCI is the QPSK or the BPSK.

S0 is an agreed value or a value configured by the network device. For example, S0 is 1, 3, 6, or 12.

The first set is {1}, and the second set is {3, 6, 12}; the first set is {1, 3}, and the second set is {6, 12}; or the first set is {1, 3, 6}, and the second set is {12}.

With reference to the foregoing descriptions, in the first to the sixth possible implementations, when the modulation scheme of the uplink data scheduled by the DCI is the QPSK or the BPSK, the correspondence between the MCS index indicated by the MCS field and the TBS index remains unchanged, as shown in Table 2.

When the modulation scheme of the uplink data scheduled by the DCI is the first modulation scheme, the correspondence between the MCS index indicated by the MCS field and the TBS index is shown in Table 3. Further, optionally, in the first to the sixth possible implementations, a quantity of bits included in at least one of the MCS field, the DCI repetition quantity field, the RV field, the repetition quantity field, and the subcarrier indicator field in the DCI is reduced.

When the quantity of bits included in the MCS field is reduced, one to three bits are removed from the MCS field. That is, the quantity of bits included in the MCS field is 1, 2, or 3. Correspondingly, when the MCS indication information is carried by using the MCS field, the quantity of bits included in the MCS indication information is 1, 2, or 3.

When the quantity of bits included in the repetition quantity field is reduced, one to three bits are removed from the repetition quantity field. That is, the quantity of bits included in the repetition quantity field is 0, 1, or 2. When the repetition quantity indication information is carried by using the repetition quantity field, the quantity of bits included in the repetition quantity indication information is 0, 1, 2, or 3. That the quantity of bits included in the repetition quantity indication information is 0 is understood as that the DCI does not include the repetition quantity indication information, or that the DCI does not include the repetition quantity field. In this case, the repetition quantity of the uplink data scheduled by the DCI is 1 or another agreed value.

When the quantity of bits included in the DCI repetition quantity field is reduced, one or two bits are removed from the DCI repetition quantity field. That is, the quantity of bits included in the DCI repetition quantity field is 0 or 1. When the DCI repetition quantity indication information is carried by using the DCI repetition quantity field, the quantity of bits included in the DCI repetition quantity indication information is 0 or 1. That the quantity of bits included in the repetition quantity indication information is 0 is understood as that the DCI does not include the DCI repetition quantity indication information, or that the DCI does not include the DCI repetition quantity field. In this case, the repetition quantity of the DCI is 1 or another agreed value.

When the quantity of bits included in the RV field is reduced, one bit is removed from the RV field. That is, the quantity of bits included in the RV field is 0. When RV indication information is carried by using the RV field, a quantity of bits included in the RV indication information is 0. That the quantity of bits included in the RV indication information is 0 is understood as that the DCI does not include the RV indication information, or that the DCI does not include the RV field. In this case, an RV for scheduling the uplink data by the DCI is agreed to be 0 or 2, or an initial RV for scheduling the uplink data by the DCI is agreed to be 0 or 2.

When the quantity of bits included in the subcarrier indicator field is reduced, one to six bits are removed from the subcarrier indicator field. That is, the quantity of bits included in the subcarrier indicator field is 0, 1, 2, 3, 4, or 5. When the subcarrier indication information is carried by using the subcarrier indicator field, a quantity of bits included in the subcarrier indication information is 0, 1, 2, 3, 4, or 5. That the quantity of bits included in the subcarrier indication information is 0 is understood as that the DCI does not include the subcarrier indication information, or that the DCI does not include the subcarrier indicator field.

When the modulation scheme of the uplink data scheduled by the DCI is the BPSK or the QPSK, the quantities of bits included in the MCS field, the DCI repetition quantity field, the repetition quantity field, the RV field, and the subcarrier indicator field remains unchanged. That is, a quantity of bits in DCI format N0 remains unchanged.

Any one of the first to the sixth possible implementations is an example. Alternatively, the modulation scheme of the uplink data is jointly indicated by using a plurality of fields in the DCI. Details about how to perform indication are not described herein.

In this embodiment of this application, the DCI further includes first information, and the first information indicates the modulation scheme of the uplink data scheduled by the DCI. For details, refer to descriptions in Embodiment 5.

In this embodiment of this application, for the first to the third possible implementations and the fifth and the sixth possible implementations, the modulation schemes of the uplink data are implicitly indicated by using different fields in the DCI, so that DCI signaling overheads are reduced.

In this embodiment of this application, in the fourth possible implementation, the modulation scheme of the uplink data is indicated by using the MCS field in the DCI, so that DCI signaling overheads are reduced. In addition, scheduling flexibility of a base station is prevented from being affected by tailoring another field. Therefore, the base station implements flexible scheduling according to this embodiment.

Embodiment 5

The DCI includes first information, and the first information is used to determine that the modulation scheme of the uplink data scheduled by the DCI is the first modulation scheme, the QPSK, or the BPSK.

For example, when a value of the first information is a first value, the modulation scheme of the uplink data scheduled by the DCI is the first modulation scheme; or when a value of the first information is a second value, the modulation scheme of the uplink data scheduled by the DCI is the QPSK or the BPSK. The first value is different from the second value. Implementations of the first value and the second value are not limited in this embodiment of this application.

The first information includes at least one bit. A quantity of included bits are determined based on an actual situation. For example, the first information includes one bit. When the value of the first information is 1, the modulation scheme of the uplink data scheduled by the DCI is the first modulation scheme; or when the value of the first information is 0, the modulation scheme of the uplink data scheduled by the DCI is the QPSK or the BPS K.

Alternatively, when the value of the first information is 0, the modulation scheme of the uplink data scheduled by the DCI is the first modulation scheme; or when the value of the first information is 1, the modulation scheme of the uplink data scheduled by the DCI is the QPSK or the BPSK. When the first information includes another quantity of bits, refer to the foregoing descriptions. Details are not described herein again.

For example, in this embodiment, when the DCI includes the first information, there is a plurality of implementations. Descriptions are separately provided below.

Implementation 1: A quantity of bits included in another indicator field in the DCI remains unchanged, and the existing DCI format N0 is extended. That is, at least one bit is added to the existing DCI format N0, and the at least one added bit is used to carry the first information.

Implementation 2: A quantity of bits included in at least one of an MCS field, an RV field, a DCI repetition quantity field, a repetition quantity field, and a subcarrier indicator field in the DCI is reduced, and some or all of redundant bits are used as bits included in the first information.

When the quantity of bits included in the MCS field is reduced, one to three bits are removed from the MCS field. That is, the quantity of bits included in the MCS field is 1, 2, or 3. Correspondingly, when MCS indication information is carried by using the MCS field, a quantity of bits included in the MCS indication information is 1, 2, or 3.

When the quantity of bits included in the repetition quantity field is reduced, one to three bits are removed from the repetition quantity field. That is, the quantity of bits included in the repetition quantity field is 0, 1, or 2. When repetition quantity indication information is carried by using the repetition quantity field, a quantity of bits included in the repetition quantity indication information is 0, 1, 2, or 3. That the quantity of bits included in the repetition quantity indication information is 0 is understood as that the DCI does not include the repetition quantity indication information, or that the DCI does not include the repetition quantity field. In this case, a repetition quantity of the uplink data scheduled by the DCI is 1 or another agreed value.

When the quantity of bits included in the DCI repetition quantity field is reduced, one or two bits are removed from the DCI repetition quantity field. That is, the quantity of bits included in the DCI repetition quantity field is 0 or 1. When DCI repetition quantity indication information is carried by using the DCI repetition quantity field, a quantity of bits included in the DCI repetition quantity indication information is 0 or 1. That the quantity of bits included in the repetition quantity indication information is 0 is understood as that the DCI does not include the DCI repetition quantity indication information, or that the DCI does not include the DCI repetition quantity field. In this case, a repetition quantity of the DCI is 1 or another agreed value.

When the quantity of bits included in the RV field is reduced, one bit is removed from the RV field. That is, the quantity of bits included in the RV field is 0. When RV indication information is carried by using the RV field, a quantity of bits included in the RV indication information is 0. That the quantity of bits included in the RV indication information is 0 is understood as that the DCI does not include the RV indication information, or that the DCI does not include the RV field. In this case, an RV for scheduling the uplink data by the DCI is agreed to be 0 or 2, or an initial RV for scheduling the uplink data by the DCI is agreed to be 0 or 2.

When the quantity of bits included in the subcarrier indicator field is reduced, one to six bits are removed from the subcarrier indicator field. That is, the quantity of bits included in the subcarrier indicator field is 0, 1, 2, 3, 4, or 5. When subcarrier indication information is carried by using the subcarrier indicator field, a quantity of bits included in the subcarrier indication information is 0, 1, 2, 3, 4, or 5. That the quantity of bits included in the subcarrier indication information is 0 is understood as that the DCI does not include the subcarrier indication information, or that the DCI does not include the subcarrier indicator field.

When the modulation scheme of the uplink data scheduled by the DCI is the BPSK or the QPSK, the quantities of bits included in the MCS field, the DCI repetition quantity field, the repetition quantity field, the RV field, and the subcarrier indicator field remains unchanged. That is, a quantity of bits in format N0 remains unchanged.

For example, the first information, the MCS field, repetition quantity field, and the subcarrier indicator field that are included in the DCI is shown in Table 10.

TABLE 10

| Content included in DCI | Quantity of included bits |
| --- | --- |
| First information | 1 |
| MCS field | 3 |
| Repetition quantity field | 2 |
| Subcarrier indicator field | 5 |

In Table 10, the first information includes one bit. The MCS field includes three bits, and one bit is reduced compared with the conventional technology. The repetition quantity field includes two bits, and one bit is reduced compared with the conventional technology. The subcarrier indicator field includes five bits, and one bit is reduced compared with the conventional technology. For other content included in the DCI, refer to Table 8. Details are not described herein again.

Table 10 is an example. There is another case, and details are not described herein.

Further, when the DCI includes the first information, and a CRC of a downlink control channel carrying the DCI is scrambled by using a semi-persistent scheduling (semi-persistent scheduling, SPS) C-RNTI, a value of the first information is a preset value. For example, when the first information includes one bit, the value of the first information is set to 0 or 1. In this case, the value of the first information does not mean anything. That is, the value of the first information is not used to indicate the modulation scheme of uplink data scheduled by the DCI.

In this embodiment of this application, some fields in the DCI are tailored, so that DCI signaling overheads are reduced.

An embodiment of this application further provides a method. For details, refer to the following descriptions.

Embodiment 6

A current NB-IoT downlink channel coding scheme is a tail biting convolutional code (tail-biting convolutional codes, TBCC). A maximum TBS is 2536 bits. After supporting 16QAM, the TBS needs to be further expanded. If the TBCC is still used for large code blocks, performance of the large code blocks deteriorates. To solve the problem, an embodiment of this application further provides a method. Descriptions are provided in detail below.

In this embodiment of this application, the following condition is agreed in advance: When a TBS of data scheduled by DCI is greater than a preset value, a channel coding scheme is Turbo. Alternatively, when an MCS indicated in DCI is greater than a preset value, a channel coding scheme is Turbo.

Step 1: A network device determines the channel coding scheme.

Step 2: The network device sends the DCI to a terminal device, where the DCI is configured to be used to indicate the channel coding scheme.

When the TBS of data scheduled by the DCI is greater than the preset value, the channel coding scheme is Turbo; or when the MCS indicated in the DCI is greater than the preset value, the channel coding scheme is Turbo.

Step 3: The terminal device receives the DCI from the network device.

Step 4: The terminal device determines the channel coding scheme based on the DCI.

The terminal device receives downlink data from the network device based on the determined channel coding scheme and scheduling information of data in the DCI, or sends uplink data to the network device.

In the foregoing method, different channel coding schemes are used based on the TBS or the MCS of data scheduled by DCI, to improve decoding performance.

Embodiments described in this specification is independent solutions, or is combined based on internal logic. These solutions fall within the protection scope of this application.

In the foregoing method embodiments, methods and operations implemented by a terminal device is alternatively implemented by a component (for example, a chip or a circuit) used in the terminal device, and the methods and the operations implemented by a network device is alternatively implemented by a component (for example, a chip or a circuit) used in the network device.

The foregoing embodiments provided in this application describes method provided in embodiments of this application from a perspective of interaction between devices. To implement functions in the foregoing methods provided in embodiments of this application, the terminal device and the network device includes a hardware structure and/or a software module, to implement the foregoing functions in a form of the hardware structure, the software module, or a combination of the hardware structure and the software module. Whether a function in the foregoing functions is performed by the hardware structure, the software module, or the combination of the hardware structure and the software module depends on applications and design constraints of the technical solutions.

Division into modules in embodiments of this application is an example, and is logical function division. During actual implementation, there is another division manner. In addition, function modules in embodiments of this application is integrated into one processor, or each of the modules exists alone physically, or two or more modules are integrated into one module. The integrated module is implemented in a form of hardware, or is implemented in a form of a software function module.

Figure 4:
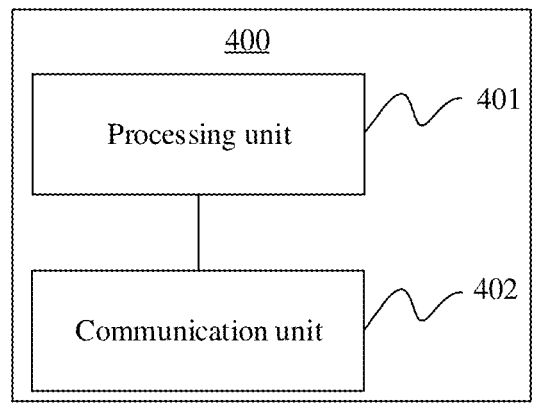
FIG. 4 is a schematic diagram of a structure of a communication apparatus according to an embodiment of this application.

Same as the foregoing concept, as shown in FIG. 4, an embodiment of this application further provides an apparatus 400. The apparatus 400 is configured to implement a function of the terminal device or the network device in the foregoing method. For example, the apparatus is a software module or a chip system. In this embodiment of this application, the chip system includes a chip, or includes a chip and another discrete component. The apparatus 400 includes a processing unit 401 and a communication unit 402.

In this embodiment of this application, the communication unit further is referred to as a transceiver unit, and includes a sending unit and/or a receiving unit, respectively configured to perform sending and receiving steps of the terminal device or the network device in the foregoing method embodiments.

Figure 5:
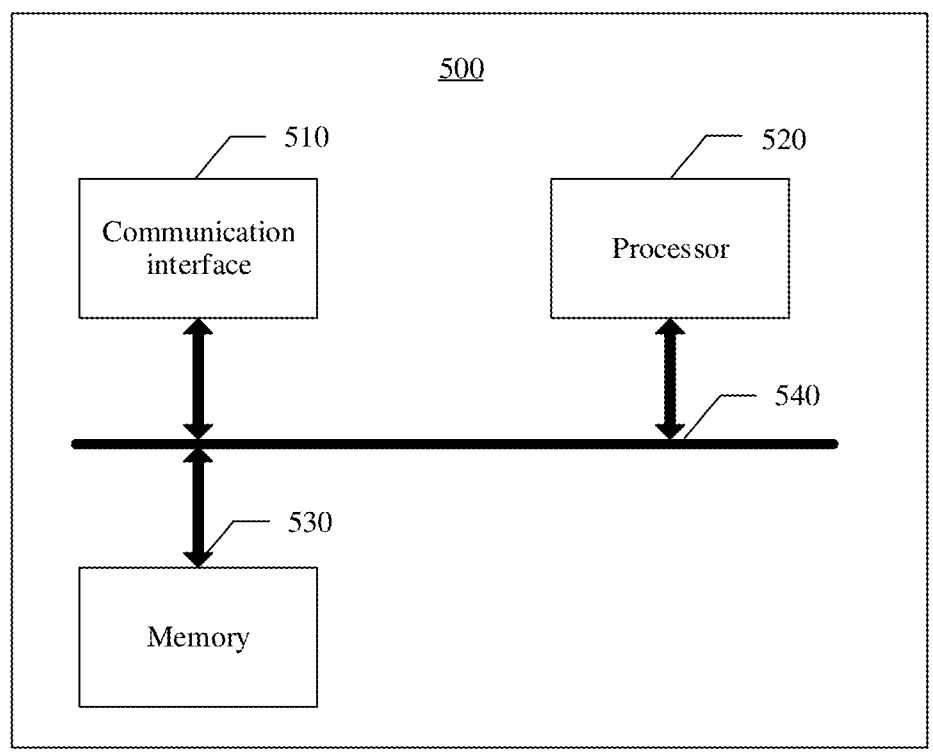
FIG. 5 is a schematic diagram of a structure of a communication apparatus according to an embodiment of this application.

The following describes in detail a communication apparatus in embodiments of this application with reference to FIG. 4 to FIG. 5. Descriptions of the apparatus embodiments correspond to the descriptions of the method embodiments. Therefore, for content that is not described in detail, refer to the foregoing method embodiments. For brevity, details are not described herein again.

In a possible design, the apparatus 400 implements steps or procedures corresponding to the terminal device or the network device in the foregoing method embodiments. Descriptions are separately provided below.

For example, when the apparatus 400 implements a function of the terminal device in the procedure shown in FIG. 2:

The communication unit 402 is configured to receive downlink control information DCI from the network device, where the DCI is used to schedule downlink data and indicate a modulation scheme of the downlink data, the modulation scheme of the downlink data is a first modulation scheme or quadrature phase shift keying QPSK, and a modulation order corresponding to the first modulation scheme is greater than 2.

The processing unit 401 is configured to determine the modulation scheme of the downlink data based on the DCI.

The communication unit 402 is configured to receive the downlink data based on the modulation scheme.

In a possible implementation, the DCI includes repetition quantity indication information, where the repetition quantity indication information is used to determine a repetition quantity $N_{Rep}$ of the downlink data. When $N_{Rep}$ is less than or equal to R0, the modulation scheme of the downlink data is the first modulation scheme; or when $N_{Rep}$ is greater than R0, the modulation scheme of the downlink data is the QPSK, where R0 is a positive integer greater than or equal to 1.

In a possible implementation, the repetition quantity indication information includes four bits.

In a possible implementation, the DCI includes DCI repetition quantity indication information, where the DCI repetition quantity indication information is used to determine a repetition quantity of the DCI. When the repetition quantity of the DCI is less than or equal to R1, the modulation scheme of the downlink data is the first modulation scheme; or when the repetition quantity of the DCI is greater than R1, the modulation scheme of the downlink data is QPSK, where R1 is a positive integer greater than or equal to 1.

In a possible implementation, the DCI repetition quantity indication information includes two bits.

In a possible implementation, the DCI includes modulation and coding scheme MCS indication information, and the MCS indication information is used to determine an MCS index of the downlink data. When the MCS index is greater than or equal to M0, the modulation scheme of the downlink data is the first modulation scheme; or when the MCS index is less than M0, the modulation scheme of the downlink data is the QPSK, where M0 is an integer greater than or equal to 0.

In a possible implementation, the MCS indication information includes four bits, five bits, or six bits.

In a possible implementation, the DCI includes first information, where the first information is used to determine that the modulation scheme of the downlink data is the first modulation scheme or the QPSK. When a value of the first information is a first value, the modulation scheme of the downlink data is the first modulation scheme; or when a value of the first information is a second value, the modulation scheme of the downlink data is the QPSK.

In a possible implementation, when a CRC of a downlink control channel carrying the DCI is scrambled by using a first RNTI, the modulation scheme of the downlink data is the first modulation scheme, and the first RNTI is configured by the network device; or when a CRC of a downlink control channel carrying the DCI is scrambled by using a C-RNTI, the modulation scheme of the downlink data is the QPSK.

In a possible implementation, when the modulation scheme of the downlink data is the first modulation scheme, a quantity of bits that are in the DCI and that are used to determine the repetition quantity of the downlink data is 0, 1, 2, or 3.

In a possible implementation, when the modulation scheme of the downlink data is the first modulation scheme, a quantity of bits that are in the DCI and that are used to determine the repetition quantity of the DCI is 0 or 1.

In a possible implementation, when the modulation scheme of the downlink data is the first modulation scheme, the DCI further includes a modulation and coding scheme MCS field, where a quantity of bits included in the MCS field is 1, 2, 3, or 4.

In a possible implementation, when the modulation scheme of the downlink data is the first modulation scheme, the DCI includes second information, and the second information is used to determine a power ratio of the downlink data scheduled by the DCI to a first signal.

In a possible implementation, the second information includes M bits, where M is an integer greater than 0.

In a possible implementation, M is less than or equal to 3.

In a possible implementation, the first modulation scheme is 8PSK, 16QAM, 64QAM, or 256QAM.

In a possible implementation, a format of the DCI is format N1.

In a possible implementation, the DCI includes second information, and the second information is used to determine a power ratio of the downlink data to a first signal.

For example, when the apparatus 400 implements a function of the network device in the procedure shown in FIG. 2:

The processing unit 401 is configured to determine a modulation scheme of downlink data.

The communication unit 402 is configured to: send downlink control information DCI to the terminal device, where the DCI is used to schedule the downlink data and indicate the modulation scheme of the downlink data, the modulation scheme of the downlink data is a first modulation scheme or quadrature phase shift keying QPSK, and a modulation order corresponding to the first modulation scheme is greater than 2; and send the downlink data to the terminal device based on the modulation scheme.

In a possible implementation, the DCI includes repetition quantity indication information, where the repetition quantity indication information is used to determine a repetition quantity $N_{Rep}$ of the downlink data. When $N_{Rep}$ is less than or equal to R0, the modulation scheme of the downlink data is the first modulation scheme; or when $N_{Rep}$ is greater than R0, the modulation scheme of the downlink data is the QPSK, where R0 is a positive integer greater than or equal to 1.

In a possible implementation, the repetition quantity indication information includes four bits.

In a possible implementation, the DCI includes DCI repetition quantity indication information, where the DCI repetition quantity indication information is used to determine a repetition quantity of the DCI. When the repetition quantity of the DCI is less than or equal to R1, the modulation scheme of the downlink data is the first modulation scheme; or when the repetition quantity of the DCI is greater than R1, the modulation scheme of the downlink data is the QPSK, where R1 is a positive integer greater than or equal to 1.

In a possible implementation, the DCI repetition quantity indication information includes two bits.

In a possible implementation, the DCI includes modulation and coding scheme MCS indication information, and the MCS indication information is used to determine an MCS index of the downlink data. When the MCS index is greater than or equal to M0, the modulation scheme of the downlink data is the first modulation scheme; or when the MCS index is less than M0, the modulation scheme of the downlink data is the QPSK, where M0 is an integer greater than or equal to 0.

In a possible implementation, the MCS indication information includes four bits, five bits, or six bits.

In a possible implementation, the DCI includes first information, where the first information is used to determine that the modulation scheme of the downlink data is the first modulation scheme or the QPSK. When a value of the first information is a first value, the modulation scheme of the downlink data is the first modulation scheme; or when a value of the first information is a second value, the modulation scheme of the downlink data is the QPSK.

In a possible implementation, when a CRC of a downlink control channel carrying the DCI is scrambled by using a first RNTI, the modulation scheme of the downlink data is the first modulation scheme, and the first RNTI is configured by the network device; or when a CRC of a downlink control channel carrying the DCI is scrambled by using a C-RNTI, the modulation scheme of the downlink data is the QPSK.

In a possible implementation, when the modulation scheme of the downlink data is the first modulation scheme, a quantity of bits that are in the DCI and that are used to determine the repetition quantity of the downlink data is 0, 1, 2, or 3.

In a possible implementation, when the modulation scheme of the downlink data is the first modulation scheme, a quantity of bits that are in the DCI and that are used to determine the repetition quantity of the DCI is 0 or 1.

In a possible implementation, when the modulation scheme of the downlink data is the first modulation scheme, the DCI further includes a modulation and coding scheme MCS field, where a quantity of bits included in the MCS field is 1, 2, 3, or 4.

In a possible implementation, when the modulation scheme of the downlink data is the first modulation scheme, the DCI includes second information, and the second information is used to determine a power ratio of the downlink data scheduled by the DCI to a first signal.

In a possible implementation, the second information includes M bits, where M is an integer greater than 0.

In a possible implementation, M is less than or equal to 3.

In a possible implementation, the first modulation scheme is 8PSK, 16QAM, 64QAM, or 256QAM.

In a possible implementation, a format of the DCI is format N1.

In a possible implementation, the DCI includes second information, and the second information is used to determine a power ratio of the downlink data to a first signal.

For example, when the apparatus 400 implements a function of the terminal device in the procedure shown in FIG. 3:

The communication unit 402 is configured to receive downlink control information DCI from the network device, where the DCI is used to schedule uplink data and indicate a modulation scheme of the uplink data, the modulation scheme of the uplink data is a first modulation scheme, quadrature phase shift keying QPSK, or BPSK, and a modulation order corresponding to the first modulation scheme is greater than 2.

The processing unit 401 is configured to determine the modulation scheme of the uplink data based on the DCI.

The communication unit 402 is configured to send the uplink data to the network device based on the modulation scheme.

The apparatus further implements another method. For details, refer to the description of the terminal device in FIG. 3. Details are not described herein again.

For example, when the apparatus 400 implements a function of the network device in the procedure shown in FIG. 3:

The processing unit 401 is configured to determine a modulation scheme of uplink data.

The communication unit 402 is configured to: send downlink control information DCI to the terminal device, where the DCI is used to schedule the uplink data and indicate the modulation scheme of the uplink data, the modulation scheme of the uplink data is a first modulation scheme, quadrature phase shift keying QPSK, or BPSK, and a modulation order corresponding to the first modulation scheme is greater than 2; and receive the uplink data from the terminal device based on the modulation scheme.

The apparatus further implements another method. For details, refer to the description of the network device in FIG. 3. Details are not described herein again.

FIG. 5 shows an apparatus 500 according to an embodiment of this application. The apparatus shown in FIG. 5 is an implementation of a hardware circuit of the apparatus shown in FIG. 4. The communication apparatus is applicable to the flowchart shown in FIG. 2, and performs functions of the terminal device or the network device in the foregoing method embodiments. For ease of description, FIG. 5 shows main components of the communication apparatus.

The apparatus 500 shown in FIG. 5 includes at least one processor 520, configured to implement any method in FIG. 2 provided in embodiments of this application.

The apparatus 500 further includes at least one memory 530, configured to store program instructions and/or data. The memory 530 is coupled to the processor 520. Couplings in embodiments of this application are indirect couplings or communication connections between apparatuses, units, or modules, is in electrical, mechanical, or other forms, and are used for information exchange between the apparatuses, the units, or the modules. The processor 520 cooperates with the memory 530. The processor 520 executes the program instructions stored in the memory 530. At least one of the at least one memory is included in the processor.

In an implementation process, steps in the foregoing methods are implemented through a hardware integrated logical circuit in the processor, or by using instructions in a form of software. The steps of the methods disclosed with reference to embodiments of this application is performed by a hardware processor, or is performed by using a combination of hardware and a software module in the processor. The software module is located in a mature storage medium in the art, such as a random-access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

The processor in embodiments of this application is an integrated circuit chip, and has a signal processing capability. In an implementation process, steps in the foregoing method embodiments are implemented through a hardware integrated logical circuit in the processor, or by using instructions in a form of software. The foregoing processor is a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, or the like. The processor implements or perform methods, steps, and logical block diagrams that are disclosed in embodiments of this application. The general-purpose processor is a microprocessor, or the processor is any conventional processor or the like. The steps of the methods disclosed with reference to embodiments of this application is performed by a hardware decoding processor, or is performed by using a combination of hardware and a software module in the decoding processor. The software module is located in a mature storage medium in the art, such as a random-access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in embodiments of this application is a volatile memory or a non-volatile memory, or includes both a volatile memory and a non-volatile memory. The non-volatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random-access memory (random access memory, RAM), and is used as an external cache. By way of example but not limitative description, many forms of RAMs are used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). The memory in the system and method described in this specification is intended to include, but is not limited to, these memories and any memory of another proper type.

The apparatus 500 further includes a communication interface 510, configured to communicate with another device by using a transmission medium, so that an apparatus in the apparatus 500 communicates with another device. In this embodiment of this application, the communication interface is a transceiver, a circuit, a bus, a module, or a communication interface of another type. In this embodiment of this application, when the communication interface is a transceiver, the transceiver includes an independent receiver and an independent transmitter, or includes a transceiver integrated with a transceiver function or an interface circuit.

The apparatus 500 further includes a communication line 540. The communication interface 510, the processor 520, and the memory 530 is connected to each other through the communication line 540. The communication line 540 is a peripheral component interconnect (peripheral component interconnect, PCI for short) bus, an extended industry standard architecture (extended industry standard architecture, EISA for short) bus, or the like. The communication line 540 is classified into an address bus, a data bus, a control bus, and the like. For ease of representation, one thick line is used to represent the bus in FIG. 5, but this does not mean that there is one bus or one type of bus.

For example, when the apparatus 500 implements a function of the terminal device in the procedure shown in FIG. 2:

The communication interface 510 is configured to receive downlink control information DCI from the network device, where the DCI is used to schedule downlink data and indicate a modulation scheme of the downlink data, the modulation scheme of the downlink data is a first modulation scheme or quadrature phase shift keying QPSK, and a modulation order corresponding to the first modulation scheme is greater than 2.

The processor 520 is configured to determine the modulation scheme of the downlink data based on the DCI.

The communication interface 510 is configured to receive the downlink data based on the modulation scheme.

In a possible implementation, the DCI includes repetition quantity indication information, where the repetition quantity indication information is used to determine a repetition quantity $N_{Rep}$ of the downlink data. When $N_{Rep}$ is less than or equal to R0, the modulation scheme of the downlink data is the first modulation scheme; or when $N_{Rep}$ is greater than R0, the modulation scheme of the downlink data is the QPSK, where R0 is a positive integer greater than or equal to 1.

In a possible implementation, the repetition quantity indication information includes four bits.

In a possible implementation, the DCI includes DCI repetition quantity indication information, where the DCI repetition quantity indication information is used to determine a repetition quantity of the DCI. When the repetition quantity of the DCI is less than or equal to R1, the modulation scheme of the downlink data is the first modulation scheme; or when the repetition quantity of the DCI is greater than R1, the modulation scheme of the downlink data is the QPSK, where R1 is a positive integer greater than or equal to 1.

In a possible implementation, the DCI repetition quantity indication information includes two bits.

In a possible implementation, the DCI includes modulation and coding scheme MCS indication information, and the MCS indication information is used to determine an MCS index of the downlink data. When the MCS index is greater than or equal to M0, the modulation scheme of the downlink data is the first modulation scheme; or when the MCS index is less than M0, the modulation scheme of the downlink data is the QPSK, where M0 is an integer greater than or equal to 0.

In a possible implementation, the MCS indication information includes four bits, five bits, or six bits.

In a possible implementation, the DCI includes first information, where the first information is used to determine that the modulation scheme of the downlink data is the first modulation scheme or the QPSK. When a value of the first information is a first value, the modulation scheme of the downlink data is the first modulation scheme; or when a value of the first information is a second value, the modulation scheme of the downlink data is the QPSK.

In a possible implementation, when a CRC of a downlink control channel carrying the DCI is scrambled by using a first RNTI, the modulation scheme of the downlink data is the first modulation scheme, and the first RNTI is configured by the network device; or when a CRC of a downlink control channel carrying the DCI is scrambled by using a C-RNTI, the modulation scheme of the downlink data is the QPSK.

In a possible implementation, when the modulation scheme of the downlink data is the first modulation scheme, a quantity of bits that are in the DCI and that are used to determine the repetition quantity of the downlink data is 0, 1, 2, or 3.

In a possible implementation, when the modulation scheme of the downlink data is the first modulation scheme, a quantity of bits that are in the DCI and that are used to determine the repetition quantity of the DCI is 0 or 1.

In a possible implementation, when the modulation scheme of the downlink data is the first modulation scheme, the DCI further includes a modulation and coding scheme MCS field, where a quantity of bits included in the MCS field is 1, 2, 3, or 4.

In a possible implementation, when the modulation scheme of the downlink data is the first modulation scheme, the DCI includes second information, and the second information is used to determine a power ratio of the downlink data scheduled by the DCI to a first signal.

In a possible implementation, the second information includes M bits, where M is an integer greater than 0.

In a possible implementation, M is less than or equal to 3.

In a possible implementation, the first modulation scheme is 8PSK, 16QAM, 64QAM, or 256QAM.

In a possible implementation, a format of the DCI is format N1.

In a possible implementation, the DCI includes second information, and the second information is used to determine a power ratio of the downlink data to a first signal.

For example, when the apparatus 500 implements a function of the network device in the procedure shown in FIG. 2:

The processor 520 is configured to determine a modulation scheme of downlink data.

The communication interface 510 is configured to: send downlink control information DCI to the terminal device, where the DCI is used to schedule the downlink data and indicate the modulation scheme of the downlink data, the modulation scheme of the downlink data is a first modulation scheme or quadrature phase shift keying QPSK, and a modulation order corresponding to the first modulation scheme is greater than 2; and send the downlink data to the terminal device based on the modulation scheme.

In a possible implementation, the DCI includes repetition quantity indication information, where the repetition quantity indication information is used to determine a repetition quantity $N_{Rep}$ of the downlink data. When $N_{Rep}$ is less than or equal to R0, the modulation scheme of the downlink data is the first modulation scheme; or when $N_{Rep}$ is greater than R0, the modulation scheme of the downlink data is the QPSK, where R0 is a positive integer greater than or equal to 1.

In a possible implementation, the repetition quantity indication information includes four bits.

In a possible implementation, the DCI includes DCI repetition quantity indication information, where the DCI repetition quantity indication information is used to determine a repetition quantity of the DCI. When the repetition quantity of the DCI is less than or equal to R1, the modulation scheme of the downlink data is the first modulation scheme; or when the repetition quantity of the DCI is greater than R1, the modulation scheme of the downlink data is the QPSK, where R1 is a positive integer greater than or equal to 1.

In a possible implementation, the DCI repetition quantity indication information includes two bits.

In a possible implementation, the DCI includes modulation and coding scheme MCS indication information, and the MCS indication information is used to determine an MCS index of the downlink data. When the MCS index is greater than or equal to M0, the modulation scheme of the downlink data is the first modulation scheme; or when the MCS index is less than M0, the modulation scheme of the downlink data is the QPSK, where M0 is an integer greater than or equal to 0.

In a possible implementation, the MCS indication information includes four bits, five bits, or six bits.

In a possible implementation, the DCI includes first information, where the first information is used to determine that the modulation scheme of the downlink data is the first modulation scheme or the QPSK. When a value of the first information is a first value, the modulation scheme of the downlink data is the first modulation scheme; or when a value of the first information is a second value, the modulation scheme of the downlink data is the QPSK.

In a possible implementation, when a CRC of a downlink control channel carrying the DCI is scrambled by using a first RNTI, the modulation scheme of the downlink data is the first modulation scheme, and the first RNTI is configured by the network device; or when a CRC of a downlink control channel carrying the DCI is scrambled by using a C-RNTI, the modulation scheme of the downlink data is the QPSK.

In a possible implementation, when the modulation scheme of the downlink data is the first modulation scheme, a quantity of bits that are in the DCI and that are used to determine the repetition quantity of the downlink data is 0, 1, 2, or 3.

In a possible implementation, when the modulation scheme of the downlink data is the first modulation scheme, a quantity of bits that are in the DCI and that are used to determine the repetition quantity of the DCI is 0 or 1.

In a possible implementation, when the modulation scheme of the downlink data is the first modulation scheme, the DCI further includes a modulation and coding scheme MCS field, where a quantity of bits included in the MCS field is 1, 2, 3, or 4.

In a possible implementation, when the modulation scheme of the downlink data is the first modulation scheme, the DCI includes second information, and the second information is used to determine a power ratio of the downlink data scheduled by the DCI to a first signal.

In a possible implementation, the second information includes M bits, where M is an integer greater than 0.

In a possible implementation, M is less than or equal to 3.

In a possible implementation, the first modulation scheme is 8PSK, 16QAM, 64QAM, or 256QAM.

In a possible implementation, a format of the DCI is format N1.

In a possible implementation, the DCI includes second information, and the second information is used to determine a power ratio of the downlink data to a first signal.

For example, when the apparatus 500 implements a function of the terminal device in the procedure shown in FIG. 3:

The communication interface 510 is configured to receive downlink control information DCI from the network device, where the DCI is used to schedule uplink data and indicate a modulation scheme of the uplink data, the modulation scheme of the uplink data is a first modulation scheme, quadrature phase shift keying QPSK, or BPSK, and a modulation order corresponding to the first modulation scheme is greater than 2.

The processor 520 is configured to determine the modulation scheme of the uplink data based on the DCI.

The communication interface 510 is configured to send the uplink data to the network device based on the modulation scheme.

The apparatus further implements another method. For details, refer to the description of the terminal device in FIG. 3. Details are not described herein again.

For example, when the apparatus 500 implements a function of the network device in the procedure shown in FIG. 3:

The processor 520 is configured to determine a modulation scheme of uplink data.

The communication interface 510 is configured to: send downlink control information DCI to the terminal device, where the DCI is used to schedule the uplink data and indicate the modulation scheme of the uplink data, the modulation scheme of the uplink data is a first modulation scheme, quadrature phase shift keying QPSK, or BPSK, and a modulation order corresponding to the first modulation scheme is greater than 2; and receive the uplink data from the terminal device based on the modulation scheme.

The apparatus further implements another method. For details, refer to the description of the network device in FIG. 3. Details are not described herein again.

A person skilled in the art understands that embodiments of this application is provided as a method, a system, or a computer program product. Therefore, this application is configured to use a form of hardware embodiments, software embodiments, or embodiments with a combination of software and hardware. Moreover, this application is configured to use a form of a computer program product that is implemented on one or more computer-usable storage media (including but not limited to a magnetic disk memory, an optical memory, and the like) that include computer-usable program code.

This application is described with reference to the flowcharts and/or block diagrams of the method, the device (system), and the computer program product according to this application. Computer program instructions are used to implement each process and/or each block in the flowcharts and/or the block diagrams and a combination of a process and/or a block in the flowcharts and/or the block diagrams. These computer program instructions are provided for a general-purpose computer, a dedicated computer, an embedded processor, or a processor of another programmable data processing device to generate a machine, so that the instructions executed by a computer or a processor of another programmable data processing device generate an apparatus for implementing a function in one or more processes in the flowcharts and/or in one or more blocks in the block diagrams.

These computer program instructions is alternatively stored in a computer-readable memory that instructs a computer or another programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

A person skilled in the art makes various modifications and variations to this application without departing from the scope of this application. This application is intended to cover these modifications and variations of this application provided that the modifications and variations fall within the scope of the claims of this application and equivalent technologies thereof.

What is claimed is:

1. A method, comprising:
receiving downlink control information (DCI) from a network device, wherein the DCI schedules data, and indicates a modulation scheme of the data, the modulation scheme of the data is 16 quadrature amplitude modulation (16QAM) or quadrature phase shift keying (QPSK), and a modulation order corresponding to 16QAM is greater than 2, wherein the DCI includes a modulation and coding scheme (MCS) field having 4 bits, the 4 bits in the MCS field indicates MCS indication information; wherein when the 4 bits in the MCS field is equal to 15, the modulation scheme of the data is 16QAM; when the 4 bits in the MCS field is less than 15, the modulation scheme of the data is QPSK; and
receiving or sending the data based on the modulation scheme.

2. The method according to claim 1, wherein the data are downlink data, when the modulation scheme of the downlink data is 16QAM, the number of bit used to determine a repetition number of the downlink data is 0, and the DCI is DCI format N1.

3. The method according to claim 2, wherein the repetition number of the downlink data is 1 or a determined value other than 1.

4. A method, comprising:
 determining a modulation scheme of data, and sending downlink control information (DCI) to a terminal device, wherein the DCI schedules the data and indicates the modulation scheme of the data, the modulation scheme of the data is 16 quadrature amplitude modulation (16QAM) or quadrature phase shift keying (QPSK), and a modulation order corresponding to 16QAM is greater than 2, wherein the DCI includes a modulation and coding scheme (MCS) field having 4 bits, the 4 bits in the MCS field indicates MCS indication information; wherein when the 4 bits in the MCS field is equal to 15, the modulation scheme of the data is 16QAM; when the 4 bits in the MCS field is less than 15, the modulation scheme of the downlink data is QPSK; and
 receiving or sending the data based on the modulation scheme.

5. The method according to claim 4, wherein the data are downlink data, when the modulation scheme of the downlink data is the first modulation scheme, the number of bit used to determine a repetition number of the downlink data is 0, and the DCI is DCI format N1.

6. An apparatus, comprising:
 at least one processor; and
 one or more memories coupled to the at least one processor and storing programming instructions for execution by the at least one processor to:
 receive downlink control information (DCI) from a network device, wherein the DCI schedules data, and indicates a modulation scheme of the data, the modulation scheme of the data is 16 quadrature amplitude modulation (16QAM) or quadrature phase shift keying (QPSK), and a modulation order corresponding to 16QAM is greater than 2, wherein the DCI includes a modulation and coding scheme (MCS) field having 4 bits, the 4 bits in the MCS field indicates MCS indication information wherein when the 4 bits in the MCS field is equal to 15, the modulation scheme of the data is 16QAM; when the 4 bits in the MCS field is less than 15, the modulation scheme of the data is QPSK; and
 receive or send the data based on the modulation scheme.

7. The apparatus according to claim 6, wherein the data are downlink data, when the modulation scheme of the downlink data is the first modulation scheme, the number of bit used to determine a repetition number of the downlink data is 0, and the DCI is DCI format N1.

8. An apparatus, comprising:
 at least one processor; and
 one or more memories coupled to the at least one processor and storing programming instructions for execution by the at least one processor to:
 determine a modulation scheme of data, and send downlink control information (DCI) to a terminal device, wherein the DCI schedules the data and indicates the modulation scheme of the data, the modulation scheme of the data is 16 quadrature amplitude modulation (16QAM) or quadrature phase shift keying (QPSK) and a modulation order corresponding to 16QAM is greater than 2, wherein the DCI includes a modulation and coding scheme (MCS) field having 4 bits, the 4 bits in the MCS field indicates MCS indication information; wherein when the 4 bits in the MCS field is equal to 15, the modulation scheme of the data is 16QAM; when the 4 bits in the MCS field is less than 15, the modulation scheme of the downlink data is QPSK; and
 receive or send the data based on the modulation scheme.

9. The apparatus according to claim 8, wherein the data are downlink data, when the modulation scheme of the downlink data is the first modulation scheme, the number of bit used to determine a repetition number of the downlink data is 0, and the DCI is DCI format N1.

* * * * *